United States Patent
Wilson

(10) Patent No.: US 7,302,481 B1
(45) Date of Patent: Nov. 27, 2007

(54) METHODS AND APPARATUS PROVIDING REMOTE MONITORING OF SECURITY AND VIDEO SYSTEMS

(76) Inventor: Randy S. Wilson, 70 Livingston St., #2L, New Haven, CT (US) 06511

( * ) Notice: Subject to any disclaimer, the term of this patent is extended or adjusted under 35 U.S.C. 154(b) by 956 days.

(21) Appl. No.: 10/408,140

(22) Filed: Apr. 4, 2003

Related U.S. Application Data

(60) Provisional application No. 60/371,856, filed on Apr. 11, 2002.

(51) Int. Cl.
 *G06F 15/177* (2006.01)
(52) U.S. Cl. .................. 709/224; 709/225; 709/229
(58) Field of Classification Search .................. None
 See application file for complete search history.

(56) References Cited

U.S. PATENT DOCUMENTS

| | | | |
|---|---|---|---|
| 6,271,752 B1 * | 8/2001 | Vaios | 340/525 |
| 6,281,790 B1 * | 8/2001 | Kimmel et al. | 340/506 |
| 6,292,098 B1 * | 9/2001 | Ebata et al. | 340/506 |
| 6,421,080 B1 * | 7/2002 | Lambert | 348/143 |
| 6,658,091 B1 * | 12/2003 | Naidoo et al. | 379/37 |
| 2002/0005894 A1 * | 1/2002 | Foodman et al. | 348/143 |
| 2003/0093430 A1 * | 5/2003 | Mottur | 707/10 |

* cited by examiner

*Primary Examiner*—Patrice Winder
(74) *Attorney, Agent, or Firm*—Chapin IP Law, LLC; Barry W. Chapin, Esq.

(57) ABSTRACT

A security system includes a proxy site that interconnects a protected site and one or more responder sites using a computer network. The protected site operates an event data collector coupled to sensors that when activated, produce event data. The event data collector can initiate connections with an event processor in the proxy site to transmit the event data to the proxy site for access by one or more of the responder sites. The event processor can receive and store the event data and can provide notifications to the responder sites of the stored event data. The responder sites can periodically poll the proxy site and can receive responses that reference available event data associated with those responder sites. The system allows responder sites share references to event data, and allows the event processor to use event rules to notify different responder sites in different manners according to different event types.

33 Claims, 10 Drawing Sheets

METHODS AND APPARATUS PROVIDING REMOTE MONITORING OF SECURITY AND VIDEO SYSTEMS

PRIORITY TO PROVISIONAL PATENT APPLICATION

This application for patent claims the benefit of the filing date of formerly filed, co-pending, United States Provisional Application for Patent entitled "METHODS AND APPARATUS PROVIDING REMOTE MONITORING OF SECURITY AND VIDEO SYSTEMS", having U.S. Ser. 60/371,856, filed Apr. 11, 2002 and assigned to the same Assignee as the present invention. The entire teachings, disclosure and contents of this referenced provisional patent application are hereby incorporated by reference herein in their entirety.

BACKGROUND OF THE INVENTION

Conventional security and monitoring systems allow a central monitoring station to receive alarm information concerning events that occur in a remote protected area. Such systems allow an operator of the monitoring station to monitor the status of sensors within the protected area and upon the occurrence of an event that triggers a sensor, conventional systems allow the operator to interact with other devices in the protected area by connecting to cameras or other monitoring devices to provide surveillance of the protected area. As an example, some conventional security systems support the remote control of cameras for Pan-Zoom-Tilt (PZT) and for selection of individual cameras from a set of cameras installed at the protected area. In order to control the behavior of the system at the protected area, a mechanism must be in place for a message to travel from a given monitor station to the protected area hardware and software. Some conventional security systems utilize a computer network medium to carry these messages. These conventional network-based security systems provide the ability to remotely connect into the hardware and software using an inbound connection from the monitoring station to the protected site in order to remotely control the cameras and sensors in the protected area.

In addition, during occurrence of an event, the conventional protected area serves as a broadcaster of the alarm information concerning the event to the remote endpoint monitor stations. This transmission is accomplished in two known ways:

1. The protected area establishes a direct independent communication pipe over a computer network or other communication medium to each endpoint monitor station; and
2. The protected area utilizes a socket based broadcast or multicast mechanism to provide alarm notifications to multiple endpoint monitoring stations simultaneously.

Both of these methods require the protected site to execute software or perform other operations that can transmit information to remote monitoring points or stations over a computer network such as the Internet.

SUMMARY OF THE INVENTION

Conventional security and monitoring systems suffer from a variety of deficiencies. Although current conventional security and monitoring systems support the basic requirement of conveying event and alarm information from one location to another over a computer network, the manner in which this is done creates substantial security problems at the protected site. By way of example, conventional transmission method 1 noted above requires independent communication lines or separate communications sessions from the protected area to each monitoring station endpoint. Such connections require the software at both ends of the channel to create and maintain a secure connection so that the authenticity of both parties can be verified and so that no other party can receive the information being transferred. This conventional method is most securely implemented over a TCP protocol connection so that the endpoint validity is established at the beginning of a connection and maintained for the duration of the transmission. While this method maintains a high level of security, it requires the same amount of bandwidth for each monitoring station endpoint to and from the protected site.

If the bandwidth required to transmit video, audio and alarm data for an event to one remote monitoring station endpoint is N kilobits per second (kbps) and the number of remote endpoints that are required to receive this information is P, then the total bandwidth required to transmit the information for an event to all endpoints is P*N. An average medium level performance DSL or Cable modem line for a typical home or business has approximately enough bandwidth for a video transmission with a sufficient picture size, frame rate and video quality to recognize people and objects in the video data with sufficient clarity. This bandwidth corresponds to the N kbps for transmission method 1. However the real bandwidth need for P endpoints is P*N, which is correspondingly P times the bandwidth most installations are currently able to provide in practical settings. Thus, a conventional implementation of method 1 requires a limitation of a single monitoring station endpoint and/or requires an Internet connection with substantially more than an average amount of bandwidth. Although this additional bandwidth can be provided, it substantially increases the cost of maintaining and operating the protected site system.

Transmission method 2 noted above solves this problem by using an Internet Protocol (IP) broadcast or multicast technique to distribute the information to multiple endpoints at the same time. Since an Internet Protocol using broadcast or multicasting techniques routs the information to multiple endpoints, the protected area security system data does not have to transmit the data multiple times for each endpoint. An example of such an implementation is to use a multicasting protocol to deliver a multimedia video and/or audio stream to multiple monitor station endpoints. Although this solves the bandwidth problem it creates a substantial security issue and also suffers from a number of other deficiencies. IP broadcast (and/or multicast) by its nature relies on the Internet to correctly route the packets of information to the correct endpoints based on IP information alone. Since the Internet itself is not a secure protocol the proper routing of such packets using only IP cannot be ensured.

In addition, since the same packets are shipped to each endpoint there is no possibility of independently verifying the authenticity of endpoints individually and encryption of such data becomes problematic due to a requirement to have many endpoints share common key material used for decryption. Conventional IP broadcast or multicasting does not utilize distinct ongoing connections so any validation of endpoints must be performed on an ongoing basis. Although it might be possible to make this method as secure as the individual connection method (i.e., method 1 above) it would require a significantly more complex system and would require the transmission of additional information possibly in both directions between endpoints to ensure the identity of the endpoints involved.

The basic operation of existing Internet based video monitoring systems additionally creates a significant security problem at the protected site. Current conventional implementations allow remote monitoring of camera video feeds (e.g., streams) by providing a program on machinery at the protected area that serves the video, audio and alarm information directly to the remote monitoring station endpoints. In order to allow a remote endpoint to connect into the system, this protected area program operates as a server that listens for remote connection requests and then sends the information requested. Inherent in this design is the requirement that the protected area machinery and equipment (e.g., a computer server) support inbound connections from the Internet or other communications network. Although authentication and encryption can reduce the possibility of an invalid entry to the protected area, the conventional computer system in the protected area cannot be protected from other attacks or hacking attempts such as denial of service attacks.

Conventional systems that allow for more advanced remote control operations such as pan-zoom-tilt (PZT) dramatically worsen the aforementioned security situation by also accepting inbound connections and requests from external locations to impose actual control of the protected area computer system. This creates additional means of attacking the protected system and may allow unauthorized control and manipulation of the security system devices, sensors, cameras and the like. Current conventional implementations for video delivery from a remote location to a remote monitoring station endpoint client are built around this need to allow connections and traffic from the Internet into the protected area computer systems.

Furthermore, conventional security systems do not provide the ability for multiple monitoring stations to each receive the same stream of video data related to the same security event at different times. As an example, if a video camera providing surveillance of an area captures unauthorized entry into a building or a protected facility, a conventional monitoring station can record the video associated with this event onto removable media such as a videocassette recorder tape. Thereafter, this videotape may be physically supplied to a secondary monitoring facility such as the customer who owns the protected facility for later viewing. This alternative event viewing capability is severely limited and cumbersome and does not allow an automated technique for relaying or notifying multiple monitor stations to share the existence, in real time, of interesting video event data for viewing the same event at different times, or for repeated viewing of captured event data.

Embodiments of the invention significantly overcome the aforementioned deficiencies of conventional security systems and can provide a security and monitoring event data processing system that may be implemented, for example, as a security system in order to automatically produce event data and processes event data for distribution to multiple responder sites in a unique manner. In particular, embodiments of the invention provide a push-based remote monitoring and event data processing system that significantly improves security at a protected site or facility. Embodiments of the invention minimize the requirement for high bandwidth data communications facilities between the protected site and a proxy site operating an event processor.

The embodiments of the invention generally provide a security system architecture that includes a protected site that comprises a computerized device that operates an event data collector. The protected site computer operating the event data collector is coupled to one or more event sensors such alarm sensors, motion sensors, water sensors, heat sensors, smoke detectors, chemical sensors or the like. The event collector is also coupled to one or more sensors called event tracking devices that may include, for example, cameras, microphones or other types of data acquisition sensors that can continually or periodically collect event data in response to a triggering or activation of one of the event sensors. The event tracker sensors or devices provide the acquired event data to the event data collector for transmission from the protected site to a proxy site that is also part of the architecture of embodiments of the invention. This transmission of event data from the protected site is performed over a connection initiated by the event data collector at the protected site. No inbound connections of any type are allowed at the protected site and all event connections from the protected site are made to only known proxy site addresses. There are no connections made from the protected site to any responder sites, as will be explained.

The proxy site is coupled to the protected site and to one or more responder sites via a communications network such as the Internet or other local or wide area network. The proxy site operates an event processor that processes event data received over an event connection initiated from the protected site in order to provide access to the event data by the responder site, through the proxy site, according to the techniques explained herein. During operation of embodiments of the invention, when an event sensor is triggered by an event within the protected site, an event data collector operating within the protected site establishes an event connection initiated for the protected site in response to the event occurring in the protected site. By having the event data collector within the protected site initiate event connections from the protected site to the proxy site, systems security is greatly enhanced. To this end, embodiments of the invention provide the protected site disallow any inbound or incoming connections over the communications network such as the Internet that couples the protected site to the proxy site. It is thus up to the event data collector operating within the protected site in response to activation of an event sensor to establish an outbound event connection from the protected site to the proxy site. Within the protected site, after activation of the event sensor, the event data collector continually receives event data from an event tracking sensor device (e.g., a video camera) and continually or periodically transmits the event data over the event connection (e.g., as a stream of event data) from the protected site to the proxy site.

The event processor operating within the proxy site receives, over the event connection, the event data associated with the event tracking device operating within the protected site. The event processor continually receives and stores the event data within an event information database accessible to the proxy site. In addition, the event processor is capable of the processing an event start message initially received over the event connection from the protected site and can evaluate the type of event that has occurred within the protected site against a set of event rules in order to identify particular responder sites that should be notified of the event occurring within the protected site. As an example, if an event start message indicates that the event connection is being established for transmission of event data associated with a burglary in progress as detected by a burglary event sensor in the protected site, the event processor operating within the proxy site can compare event information in event start message identifying a type of sensor triggered during event (e.g., a sensor for the back door) with the event rules in order to identify a monitor responder (or more than one) such as a police or third party commercial security system monitoring company that should be notified of the event.

In addition, the proxy site can create an event notification that identifies the event and can post the event notification within an event availability queue for access by the proper responder site that can periodically poll the proxy site for events of interest to that responder site. In addition, the event processor operating in the proxy site can begin to continually receive and store event data (e.g., video data) being produced and transmitted from the protected site over the event connection. The event data may be, for example, streaming media data such as audio and/or video data produced by sensors and/or other event tracking devices operating within the protected site. The event data collector periodically or continually transmits the event data from the protected site, over the event connection to the proxy site, for storage within the event information database for subsequent access by responder sites.

A responder site operating an event monitor application under control of a responder user (e.g., a person) can automatically operate to provide periodic event polls that request the availability of any event notifications associated with the identity of the responder site to the proxy site. The event processor operating within the proxy site can receive a periodic event poll and can determine which, if any, event notifications should be forwarded in an event poll response to the responder site. In this manner, embodiments of the invention allow the responder sites to initiate a responder connection to the proxy site to provide a periodic event poll request and the event processor can provide an event poll response to identify those event notifications associated with that responder site over the responder connection initiated by the responder site. The proxy site thus insulates the protected site from receiving direct connections from any responder site thus greatly enhancing security of the protected site.

When a responder site receives an event poll response that contains an event notification identifying the existence of event data for a related event that this responder site should monitor, the responder site activates an event monitor application such as a video viewing application or web browser that can provide an event monitor application request for access to the stored event data within the proxy site associated with the event notification identified within the event poll response. The proxy site receives event monitor application requests for access to the stored event data associated with the event notification and in response, transmits the event data over the responder connection to the event monitor application that then displays the event data to a responder user of the responder site. This allows a user at the responder site operating the event monitor application to perceive (e.g., to view and hear) the event data that can be any type of multimedia data such as video data, audio data, sensor data (analog or digital information) or other collected information such as the time of the event, the address of the protected site, status of other sensors, and the like.

Using the aforementioned general architecture of embodiments of the invention, a security system is provided with significant flexibility while maintaining high levels of security with respect to protecting the protected site from unauthorized access to event data and unauthorized operation of event sensor and monitoring equipment.

In other embodiments of the invention, multiple responder sites may be activated and notified of a particular event by the event processor operating within the proxy site.

In particular, embodiments of the invention can include event rules within an event information database that indicate different actions required to notify different responder sites in different ways. Using the burglary example from above, when the event processor in the proxy site receives the initial event start message from the protected site over the event connection initiated by the protected site, the event processor may use the event rules to determine that a commercial security monitoring organization operating as one responder site should be immediately notified of the event and that in addition, a local police department or other law enforcement agency should also be notified depending, for example, on the severity of event, that may be indicated by which particular event sensor(s) within the protected site was/were triggered during occurrence of the burglary event. At any time during the event, the user of the responder monitor application may also select other parties to be informed of the event. The list of possible other parties is similarly determined by event rules associated with the particular event sensors activated during the event.

If the sensor indicated that a vault of the bank operating as the protected site were opened in unauthorized manner, this type of event can indicate, for example, a high security situation in which many responder sites should be instantly notified of the event. Alternatively, if the event sensor triggered during the event within the protected site was a motion sensor in a residential home, the event rules can be established or configured such that the event processor initially notifies a commercial security monitoring organization responder site which can then attempt to place a telephone call to the residence to determine if the event was a false alarm. If a period of time elapses and the responder site does not cause the event to be cleared (as will be explained), the event processor can notify another responder site such as the police department to investigate the problem further.

Other embodiments of the invention provide the ability for one or more responder monitor sites to communicate the existence of event information of interest to other responder sites via the proxy site. In particular, embodiments of the invention support the capability of one responder site, such as a primary or "monitor" responder site (e.g., a security company) to create a bookmark work item that identifies a segment of event data to be brought to the attention of another secondary or "client" responder site. In response to receiving a bookmark worker item, the event processor operating in the proxy site can prepare a bookmark notification associated with that segment of event data (e.g., a bookmark work item identifying a video segment of interest showing a burglary in progress) and can forward the bookmark notification to the client responder site in response to a periodic poll provided from that client responder site, thus allowing the client responder site to be notified of the existence of the segment of event data associated with the bookmark work item.

This secondary or client responder site can then prepare and forward a bookmark playback request to the event processor within the proxy site and can receive, in response, the segment of event data associated with the bookmark notification to allow that client responder site to access the segment of video data identified by the bookmark work item received from the primary monitor responder site. In this manner, embodiments of the invention allow two or more responder sites to notify each other of event data that may be of interest that provides for enhanced security and protection measures with respect to protecting the protected site.

Other embodiments include a device such as computer system configured to perform all of the aforementioned methods of processing as explained herein for the event data collector in the protected site, the event processor in the proxy site, and the event monitor application in the responder site(s). That is, a computer system configured to perform the processing operations explained herein for any one of the protected site, proxy site and/or responder site(s) is considered an embodiment of the invention. Such embodiments generally include a computer system having at least one communications interface, a controller such as a processor, a memory, one or more sensors (for the protected site embodiments), and an interconnection mechanism coupling the communications interface(s), the memory and the controller. The controller or processor is configured to access the memory encoded with logic instructions for either the event data collector (if the protected site), the event processor (if the proxy site) or the event monitor application (if the responder site) in order to execute, run, interpret or otherwise perform those instructions to provide the respective processing operations for each of those respective devices (protected site, proxy site and responder site) as explained herein.

Other embodiments of the invention that are disclosed herein include software programs, including both source code encoded on a computer readable medium (e.g., on a disk) and as object code executing in a computerized device, to perform any or all of the operations summarized above and disclosed in detail below for each of the event data collector processing and sensor operation (in the protected site), the event processor processing (in the proxy site) and the event monitor application (in the responder site(s)). More particularly, one embodiment provides a computer program product that has a computer-readable medium including computer program logic encoded thereon to provide the method and processing operations explained herein. The computer program logic, when executed on at least one processor within a computing system, causes the processor to perform the operations (e.g., the method embodiments above, and described in detail later) indicated herein. These arrangements of the invention are typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention for any or all of the protected site (and its associated sensors), the proxy site, and the responder site(s).

It is to be understood that the system of the invention can be embodied strictly as a software program, as software and hardware, or as hardware alone. Is also to be understood that the method steps of this invention typically perform (e.g., execute, run, or are otherwise operated) on devices coupled to a communications or computer network such as, for example, the Internet.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF THE INVENTION

Figure 1:
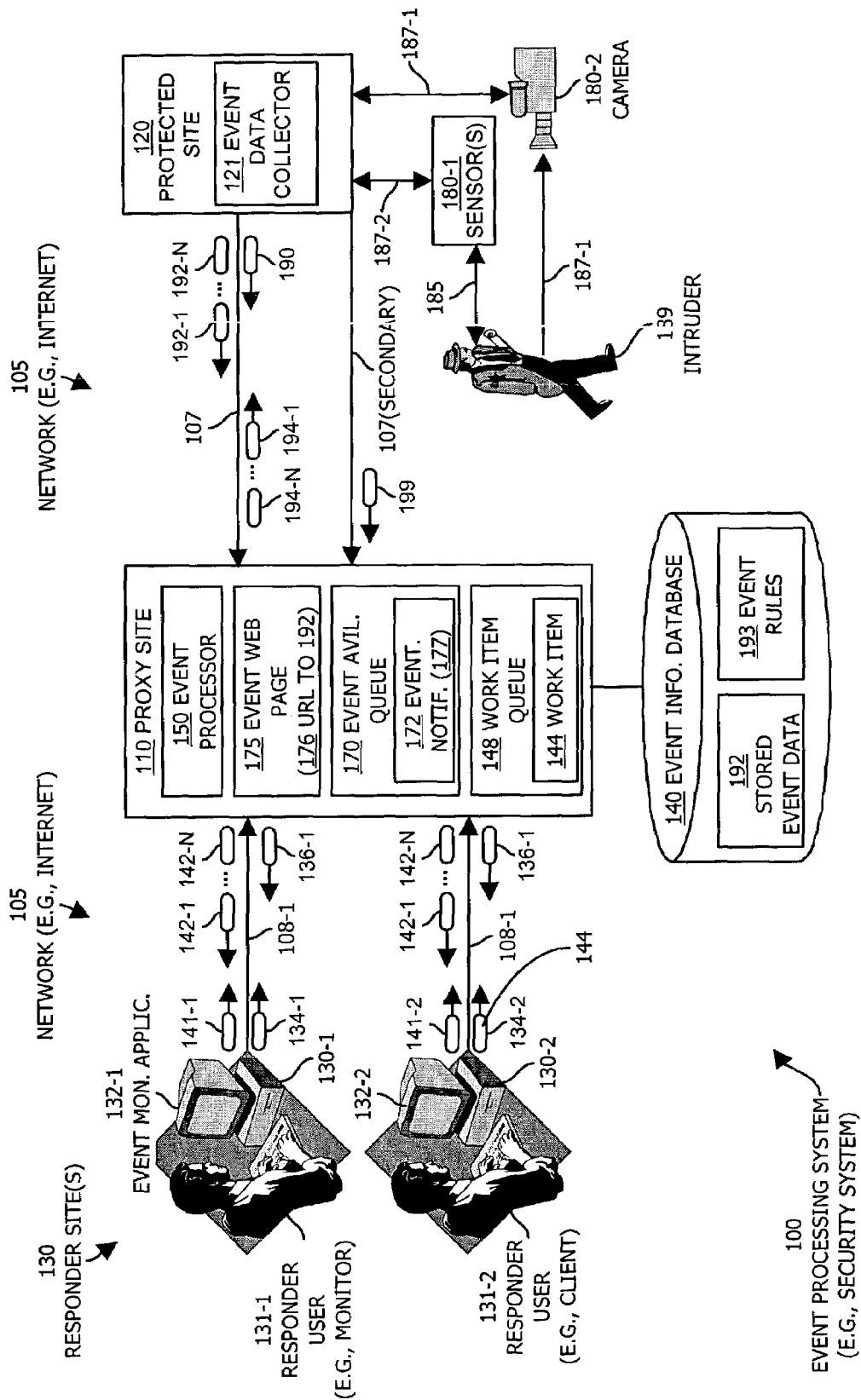
FIG. 1 illustrates an example event processing system configured according to one embodiment of the invention.

FIG. 1 illustrates an event processing system 100 configured in accordance with one example embodiment of the invention. The event processing system 100 in FIG. 1 includes a communications medium 105 such as a computer network medium (e.g., a wide area network such as the Internet) that interconnects a proxy site 110, a protected site 120 and one or more responder sites 130 (130-1 and 130-2 in this example). The protected site 120, proxy site 110 and responder sites 130 may each be, for example, computer systems.

The proxy site 110 includes an associated event information database 140 that maintains stored event data 192 (as will be explained) and is further configured to operate an event processor 150. The proxy site 110 in this example also includes an event availability queue 170 and an event web page 175, the purposes of which will be explained shortly.

The protected site 120 operates an event data collector 121 (as will be explained) and further includes in interconnection of one or more event sensors 180 that in this example include an alarm or monitoring sensor 180-1 and an event tracking sensor 180-2, (e.g., a camera in this example). The event sensors 180 may be any type of sensor that can be activated in some manner (e.g., in response to an event 185)

to provide event data 187 to the event data collector 121. The event data can include a signal indicating activation of an event sensor 180 and can also include a continuous or periodic stream of data, such as video data, audio data, or the like. In this example, the event sensor 180-1 is an alarm sensor such as a motion detector to detect the presence of the intruder 189 and signals this event 185 within the event data 187-2. In response, the event data collector 121 can activate other sensors 180 such as event tracking device sensor 180-2, which in this example is a video camera that can capture real-time motion video event data 187-1 in response to activation of the alarm event sensor 180-1. The camera event sensor 180-2 (referred to herein as an event tracking sensor or device) can continually provide the event data 187 as a streaming video signal to the event data collector 121 until instructed to operate otherwise.

As will be explained further, when an event sensor 180 detects an event 185 and the event data collector 121 begins to receive a stream of event data 187, the event data collector 121 can initiate an event connection 107 from the protected site 120 to the event processor 150 (e.g., a software program) operating within the proxy site 110. The protected site 120 and the proxy site 110 in this example of are computer systems operating on the computer network 105 such as the Internet and the event data collector 121 and event processor 150 are software programs, applications or other processes operating within the respective protected site and proxy site computer systems 110 and 120. As will be explained further, when the event processor 150 receives an event start message 190 that the event data collector 121 initially transmits over the event connection 107, the event processor 150 can access event rules 193 stored within the event information database 140 in order to determine a set of event activities to perform in response to the event start message 190. The event activities can include making event notifications 172 available to one or more responder sites 130 within the event availability queue 170, also as will be explained in detail.

Generally, the responder sites 130 are also computer systems that operate event monitor applications 132 (e.g., software programs). The event monitor applications 132 include a graphical user interface that a responder user 131 can use to interact and view and review event data, as will be explained. The responder users 131-1 may be, for example, commercial security personnel of a commercial security company hired by an owner of the property or other facility that the protected site 120 operates within to detect intrusions, fires, alarms, or other events 185 of interest. Other examples of responder users 131-2 include police or fire department personnel. As will be explained further, a responder user 131-2 may also be an owner of the property or facility associated with the protected site 120. In such cases, the responder user 131-2 is referred to as a "client" responder user 131-2 and the responder site 132-2 for this user may be, for example, a personal computer within the home or remote office of the responder user 131-2.

The event monitoring application 132 operating in the responder site computer system 130 provides a visual interface on the computer display of the responder site computer system 130 (generally referred to as the responder site 130 herein) that allows the responder user 131 to receive event information such as the event data 192 (in a stream 142, as will be explained), for events 185 associated with one or more protected sites 120 to which that responder user 131 has an interest in and is authorized to view or otherwise access such event data 192.

In operation, the event monitor applications 132 are capable of providing periodic event polls 134 over a responder connection 108 initiated from the responder sites 130 to the proxy site 110. The event processor 150 in the proxy site 110 can receive an event poll 134 from a responder site 130 and can compare information in the event poll 134, such as the identity of the responder site 130, to information regarding event notifications 172 within an event availability queue 170. If the event processor 150 detects a matching event notification 172 (or more than one), the event processor 150 can provide an event poll response 136 back to the event monitor application 132 operating a particular responder site 130 that indicates to that responder site 130 that an event has occurred of importance to the responder site 130 and that stored event data 192 is available for access by the responder site 130 from the proxy site 110.

Assume for this discussion that the event monitor application 132 in the responder site 130 operates the periodic polling technique and thus provides an event monitor application request 141 for access to the stored event data 192 associated with the event notification 172 identified within the event poll response 136. The event processor 150 in the proxy site 110 can receive the event monitor application request 141 and can access the stored event data 192 and transmit the stored event data 192 as event data stream 142 over the responder connection to the event monitor application 132 for display at the responder site (e.g., on a computer display) to the responder user 131.

Also as will be explained in more detail, there can be different types of responder sites 130, some of which have event monitor applications 132 equipped with more features to provide enhanced event management capabilities, while other responder sites 130 have limited event capabilities such as only the capability to view event data but not control event sensors such as a camera 180-2 within the protected site 120 using work items, as will be explained later. In particular, in some embodiments of the invention, not all responder sites 130 provide periodic event polls 134 at all times.

One type of responder site 130-1, referred to herein as a "monitor" responder site, is generally considered a computer system site 130 in which there is always a responder user 131-1 (e.g., a person) present and watching over the event monitor application 132-1. Examples of monitor responder sites 130-1 are the commercial security company noted above that constantly staffs security personnel 131-1 who are responsible for constantly monitoring (i.e., watching) the event monitor application 132-2 for events of interest. Thus, in one embodiment of the invention, monitor responder sites 130-1 issue periodic event polls 134 to query the proxy site 110 for event information of interest to this responder site for particular protected sites 120. As will also be explained further, if a responder site 130-1 engages in reception of a stream of event data 142 (as will be explained), and the monitor responder user 131-1 (e.g., a commercial security person) decides that the event data 142 is or would probably be of interest to a client responder user 131-2, the monitor responder user 131-1 can contact another type of responder site 130, called a "client" responder site 130-2 operated by a responder user 132-2 using any type of communications mechanism, such as an instant message, email, phone call, or other technique, to notify that client responder user 131-2 that they should operate (e.g., begin to execute) their event monitor application 132-2 (that may not have been executing or otherwise activated at that time) in order to contact the proxy site 110 in order to access stored event data 192, as will be explained. The point is that some responder sites 130 can engage in constant periodic polling 134 to detect events 185 in near real-time, while other responder sites 130 can thereafter be brought online and can engage in communications with the proxy site 110 at a later time in order to also receive event data 192 of interest. In another embodiment of the invention, the proxy site 110 may consult event rules 133 associated with the sensor activity starting the event and cause selected automatic notification of one or more "client" responder sites 130-2 operated by a responder user 132-2 using any type of communications mechanism, such as an instant message, email, phone call, or other technique, to notify that client responder user 131-2 that they should operate (e.g., begin to execute) their event monitor application 132-2 (that may not have been executing or otherwise activated at that time) in order to contact the proxy site 110 in order to access stored event data 192, as will be explained.

Further details of embodiments of the invention will be explained with respect to flow charts of processing steps and other architecture figures as discussed in the following description of other embodiments of the invention.

Protected Site Operation

Figure 2:
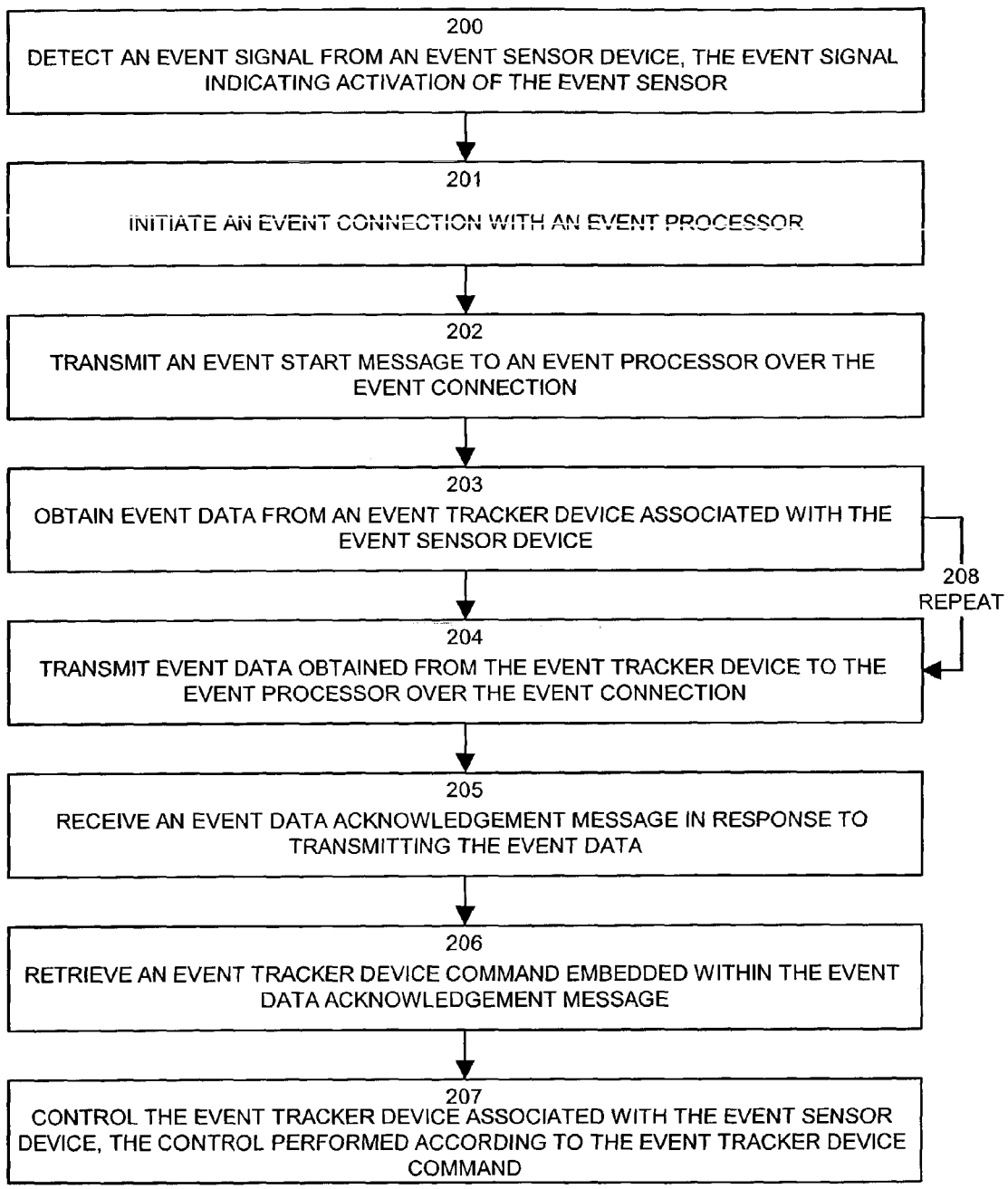
FIG. 2 is a flow chart of processing steps that a protected site computer system configured with an event data collector performs in accordance with one example embodiment of the invention.

FIG. 2 is a flow chart of processing steps that describe a method for processing event data and other information by an event data collector 121 operating within a protected site 120 in accordance with one example embodiment of the invention.

In step 200, in response to a triggering event 185 (triggered in FIG. 1 by the intruder 189), the event data collector 121 detects an event signal 187 (a type of event data) from an event sensor device 180 (e.g., alarm sensor 180-1 in FIG. 1). The event signal 187 indicates activation of the event sensor 180.

In step 201, in response to detecting the event signal 187 the event data collector 121 initiates an event connection 107 with an event processor 150 operating in the proxy site 110. The event connection 107 may be, for example, the TCP connection initiated by the event data collector process 121 operating in the protected site computer system 120 to a predetermined network address and predefined port number associated with the event processor 150 operating in the proxy site 110. In the case of a TCP connection, the event data collector 121 thus initiates the connection by sending a TCP synchronize (i.e., a TCP SYN) packet to the known address of the proxy site 110 for a known or predefined TCP port number that the event processor 150 listens upon. Thereafter, the event processor 150 can acknowledge this initial connection establishment TCP SYN packet with a TCP acknowledgement packet (i.e., SYN ACK).

Next, in step 202 the event data collector 121 transmits an event start message 190 to the event processor 150 over the event connection 107 (e.g., within a TCP SYN ACK ACK packet, thus completing the event connection 107 initiated from the protected site 120). The event start message 190 may be information contained in the TCP packet that identifies, for example, a particular protected site 120 identity along with a sensor 180 identify, sensor 180 type, name of the sensor 180, time of the event, site authentication and encryption information, and possibly other information.

More specifically, the event start message 190 can include an event type such as fire, smoke, broken glass, water, chemical, unauthorized entry (e.g., into a window or other entryway) and the like that indicates what type of event 185 has occurred in the protected site 120. The event start message 190 can also included a timestamp indicating the time of occurrence of the event 185 as detected by the sensor 180 within the protected site 120. Further still, the event start message 190 can contain authentication information such as a digital certificate or digital signature associated with the protected site 120 that can allow the event processor 150 within the proxy site 110 to validate the authenticity of the event start message 190 upon receipt. The event data collector 121 can further encrypt information within the event start message 190 to prevent unauthorized interception and access to this information as it propagates in the network 105. As will be explained shortly, information within the event start message 190 allows the event processor 150 in the proxy site 110 to decide on activities associated with notification of responder sites 130 regarding the occurrence of the event 185 as identified in event start message 190 using event rules 193.

In step 203 the event data collector 121 obtains event data 187 from an event tracker sensor device 180-2 (i.e., such as a video camera as illustrated in FIG. 1) associated with the event sensor device 180-1 that detected the event 185. In other words, in step 203 the event data collector 121 can receive input in the form of event data 187 from one or more sensor devices 180 to indicate initial occurrence of the event 185 and that can further receive a continuous, periodic, bursty or other flow or stream of event data 187 from the sensor devices 180. In the illustrated example, the event tracker device 180-2 is a camera sensor device (e.g., a video camera) and the event data 187-1 is image data obtained continuously or periodically from the camera device 180-2 in response to activation of the camera device 180-2 in response to the event signal 187-2 from the event sensor device 180-1.

In an alternative arrangement, the event sensor device 180-1 could be directly coupled to the event tracker device 180-2 to cause activation of the event tracker device 182 instead of having the event data collector 121 coordinate activation of event tracker devices 180 in response to events 185 that trigger event sensor devices 180. Other examples of event tracker devices 182 (which are generally referred to herein as event sensors as well) include microphones, measurement sensors for measurement of quantities of materials such as vapors, gases, chemical compounds and the like, and any other type of device that can be configured to monitor and acquire and transmit event data 187 based on the occurrence of event 185 in a certain area.

It is to be understood that the example illustration in FIG. 1 shows only two sensor devices 180-1 and 180-2 by way of example only and is further illustrated to indicate that the first sensor device 180-1 detects the initial event 185 and that the second sensor device 180-2 is activated in response to operation of the first sensor device 180-1 to begin capturing further event data 187-1 in the form of video (and possibly audio) data. Those skilled in the art will understand that there can be many different types of sensor devices 180, some of which are activated in response to others such as in the illustrated example, and others of which when activated, can themselves "track" an event and collect and produce a continual or periodic stream of event data 187 and can provide this event data to the event data collector 121.

In step 204, the event data collector 121 transmits the event data 187 obtained from the event tracker device 180-2 as a stream of event data packets 192-1 through 192-N to the event processor 150 over the event connection 107 at a certain event data rate. Accordingly, once the sensor 180 detected an event 185, the event data collector 121 in this embodiment of the invention prepares and transmits the event start message 190 for receipt by an event processor 150 operating in a proxy site 110 and further begins to collect and transmit event data 187 as a stream of event data packets 192-1 through 192-N for receipt by the event processor 150. The rate of transmission of event data packets 192 can vary depending upon the configuration of embodiments of the invention. The specific data rate can depend upon factors such as the available bandwidth from the protected site 120 to the proxy site 110, the type and amount or density of the event data, the rate of production of the event data and so forth. As an example, if the event data 187 is video data, the event data collector 121 may capture or collect and transmit the event video data 192 at a certain frame rate such as 4 frames per second (a relatively low bandwidth transmission) or 10 frames per second (a significantly high frame rate), and so forth. A higher frame rate produces a better video perception by the responder user 131, as will be explained. Note that if the data rate of transmission of event data packets 192 (e.g., a frame rate for video packets) is slower than the rate of production of event data from a particular event data sensor 180, such as the camera event tracker device, the event data collector 121 can discard the unsent event data 187.

Alternatively, the event data collector 121 can store the event data 187 in its complete form within a storage medium (not specifically shown in this example) within the protected site 120 for future access. As an example, if a camera 180-2 produces a stream of event data 187-1 at a frame rate of twenty frames per second, but the event data collector 121 only transmits event data packets 192 at an equivalent rate of five frames per second, the event data collector can store the complete event data stream 187 in a local storage area (e.g. a disk, as digital video content) so that future access to the additional fifteen frames per second of unsent video data can be provided at a later time, if required.

Note that in this example embodiment, no acknowledgments are necessary by the event processor 150 of event start message 190. In an alternative arrangement of the invention, the event data collector 121 can immediately begin to collect event data 187 from the sensors 180 in response to an event 185 and can temporarily store or buffer event data within the protected site 120 (e.g., within the storage medium such as a disk or in a memory) until receipt of an acknowledgment of an event start message 190 from a proxy site 110 at which point the event data collector 121 can then begin to provide a stream of event data 192 to the proxy site 110 that acknowledged receipt of the event start message 190.

In another alternative configuration of the invention, there may be several proxy sites 110 and the event start message 190 may be broadcast to each proxy site 110 in order to provide redundancy in the event that one proxy site 110 is unable to process an event start message 190 due to performance reasons or other concerns. In a further alternative embodiment, the event data collector 121 can be preconfigured with a proxy site order or list of several possible proxy sites 110-1, 110-2 . . . 110-P (not shown in the illustrated example in FIG. 1), and so forth and the event data collector 121 can use successive attempts to transmit an event start message 190 to multiple proxy sites 110 according to the proxy site order list. The event data collector 121 can await a predetermined amount of time for acknowledgment from a particular proxy site 110-X of an event start message 190-X before attempting to send another event start message 190-X+1 to the next proxy site 110-X+1 in the proxy site order list. In this manner, by providing multiple proxy sites 110 available for communication with the event data collector 121, a high level of redundancy and security is thus provided by embodiments of the invention.

In step 205, the event data collector 121 receives an event data acknowledgement message 194-1 through 194-N in response to transmitting each packet of event data 192-1 through 192-N over the event connection 107. In other words, in this example, for each packet of event data 192 that the event data collector 121 transmits to the event processor 150 in a proxy site 110, the event processor 150 can respond with a respective corresponding acknowledgment packet 194 for that packet of event data 192.

In one embodiment of the invention, the event data collector 121 establishes a separate event connection 107 for transmission of each packet of event data 192 the protected site 120 sends to the event processor 150 operating in the proxy site 110. That is, in this example embodiment of the invention, the event data collector 121 establishes a separate TCP/IP connection from the protected site 120 to the proxy site 110 and transmits a single packet of event data 192 over this new TCP/IP event connection 107 and then, upon receiving a TCP acknowledgment packet 194 in response to transmission of the event data packet 192 to the proxy site 110, the event data collector 121 can close that particular event connection 107. Thus, in this example embodiment the event data collector 121 transmits each event data packet 192 over a separate individual event connection 107 and upon receiving an acknowledgment packet 194 in response, closes the connection. This process can be repeated using a separate new event connection 107 for each packet of event data.

In embodiments of the invention, each packet of event data 192 can contain information identifying the protected site 120 and the identity of the event sensor or tracking device 180 that produced the event data 192 and can further include a sequence or frame number associated with the event data 192 thus allowing the event processor 150 to reassemble separately received event data packets 192 (or packets received over the same event connection) into a continuous stream of event data stored (192) within the event information database 140 to allow proper event data playback or re-creation. Furthermore, each event data packet can contain a common event identification thus allowing the event processor 150 to associate all event data packets 192 to a common event 185.

In an alternative embodiment of the invention, the event data collector 121 can transmit all event data packets 192 over the same event connection 107 that remain open for the lifetime of the existence of the event (i.e., until an event is closed, as will be explained). Likewise, in this and other embodiments of the invention, the event processor 150 can return each event data acknowledgement 194 to the event data collector 121 operating in a protected site 120 over the same event connection 107 thus utilizing a single TCP/IP connection session for transmission and receipt of all event data 192 and event data acknowledgements 194 for a single event 185.

According to embodiments of the invention as will be explained in more detail shortly, the event processor 150 operating in the proxy site 110 can also receive event tracker device commands in the form of work items 144 from responder sites 130 with which the event processor 150 communicates. As an example, a responder user 131 might desire to provide a camera command work item 144 such as pan, tilt or zoom to remotely control and operate an event tracker camera device 180-2 within the protected site 120 during the ongoing occurrence of an event 185. As will be explained, the event processor 150 can piggyback or otherwise insert or embed the event tracker device commands or other work items 144 (as will be explained in more detail) into an event data acknowledgment message 194. Accordingly, the event data acknowledgements 194 can serve to both acknowledge receipt of a particular packet of event data 192 (or group of event data packets) to the event data collector 121 and can also serve as a mechanism to transport or carry event tracker device commands in work items 144 from the event processor 150 in the proxy site 110 to the event data collector 121 operating in the protected site 120.

In step 206 in this example embodiment of the invention, the event data collector 121 retrieves an event tracker device command work item 144 embedded within the event data acknowledgement message 194. As briefly mentioned above, the event tracker device command work item 144 is generally a command that a responder user 131 operating a responder site 130 can issue to particularly control an event sensor 180 within the protected site 120 for a particular purpose. Examples include panning, zooming, tilting and focusing a camera device, adjusting attenuation of a microphone device, or any other type of command that may be provided to a data acquisition device 180 to remotely control that device in some manner. In the illustrated example, the event tracker device command work item 144 is a camera command embedded within the received event data acknowledgement message 194. The camera command specifies an operation to be performed by the camera device 180-2, such as panning, tilting, zooming or focusing in order to track or locate the movements or whereabouts of the intruder 189 within the protected site 120.

In step 207, in response to retrieving the event tracker device command work item 144, the event data collector 121 controls the event tracker device sensor 180-2 associated with the event sensor device 180-1 to control performance of the event tracker sensor device 180-2 according to the event tracker device command work item 144. Other purposes of the event tracker device command in work item 144 can be to reset a particular sensor device 180 for subsequent activation in response to a new event 185.

In step 208, the event data collector 121 repeats the steps of obtaining event data 187 and transmitting event data 192 to continuously supply the event processor 150 with event data 192 from the event tracker device 180-2 over the event connection 107. This process can continue until either the event data collector 121 determines that the event 185 is over with, or until an event tracker device command work item 144 is submitted from a responder site instructing the event data collector 121 to terminate or close the event and reset operation of event sensor devices 180 and cancel transmission of event data 192. This effectively closes the event and the event processor 150 can remove or archive the event data 192 stored in the proxy site's 110 event information database 140. The event data collector 121 can also store all event data 187 related to that event 185 for future access.

In this manner, embodiments of the invention provide a protected site 120 and operate an event data collector 121 to perform generally according to the processing operations explained in the example embodiments above to provide security to the protected site 120. Since the protected site 120 is responsible for initiating all outbound event connections 107 for notification of events 185 to the event processor 150 within the proxy site 110, the event data collector 121 can effectively disallow any inbound or incoming network connections over the network media 105. This prevents unauthorized access and/or manipulation of the event data collector process 121 operating within the protected site computer system 120.

Proxy Site Operation

Further details of other embodiments of the invention will now be provided regarding the operation of the event processor 150 within the proxy site 110 and with respect to the operation of the responder site 130.

Figure 3:
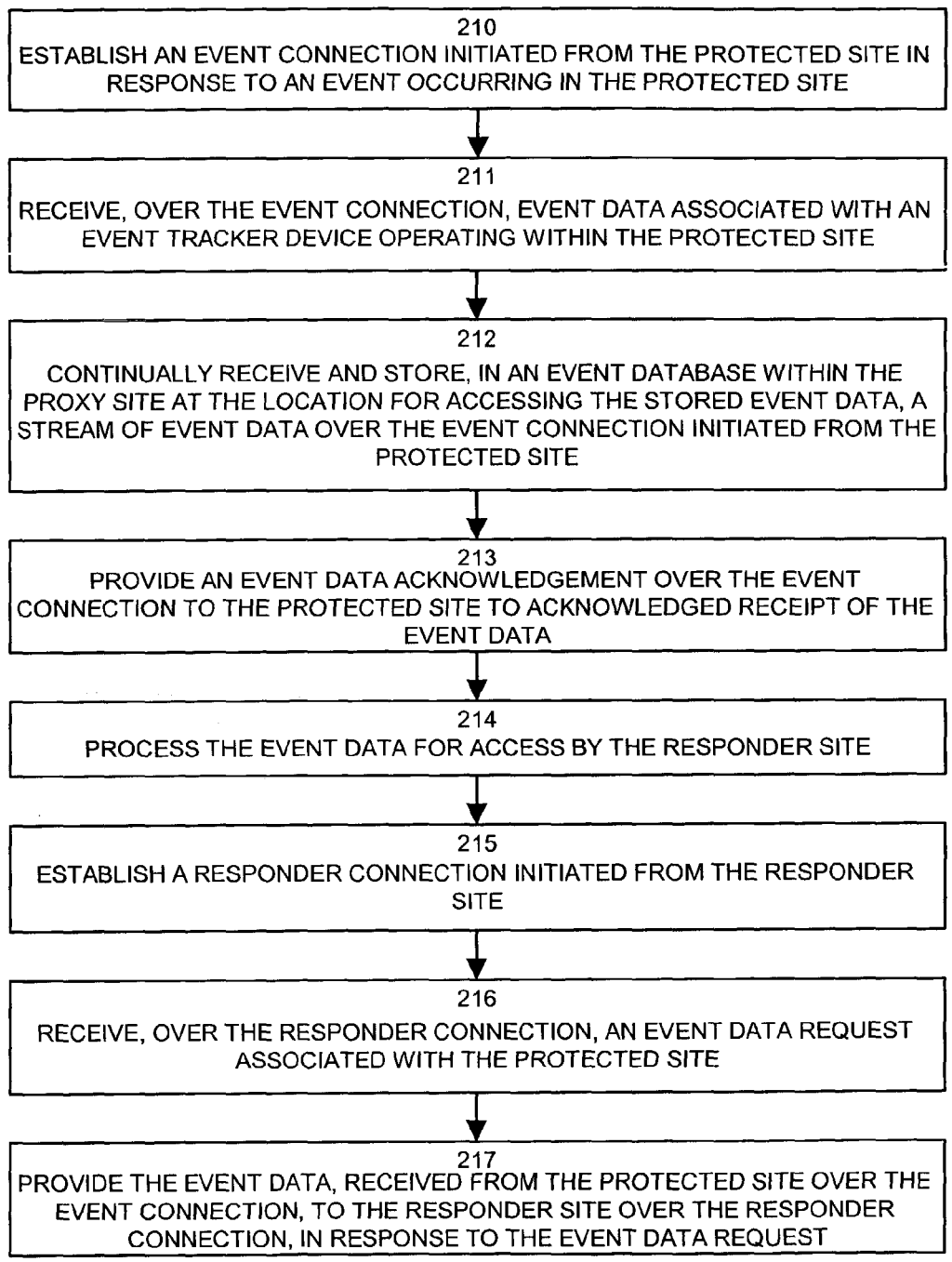
FIG. 3 is a flow chart of processing steps that an event processor operating in a proxy site performs according to high-level operations of embodiments of the invention.

FIG. 3 is a flow chart of processing steps that illustrates operations performed by the event processor 150 operating within the proxy site 110 according to one example embodiment of the invention. The processing steps illustrated in FIG. 3 are intended to provide an example of high-level operations performed by the event processor 150 operating in a proxy site 110. Details of processing of many of the steps in FIG. 3 in accordance with various alternative embodiments of the invention will be discussed later with respect to flow charts that follow FIG. 3 and that explain certain intricacies and variations of specific operations related to the general steps discussed below and shown in FIG. 3. Generally, the high-level processing steps shown in the flow chart in FIG. 3 are performed by the event processor 150 operating in a proxy site 110 coupled to a protected site 120 and to at least one responder site 130 via the communications network 105. The event processor 150 generally provides a method for processing event data 192 received from the protected site 120 for access by the responder site(s) 130.

In step 210, the event processor 150 in the proxy site 110 establishes an event connection 107 initiated from the protected site 120 in response to an event 185 occurring in the protected site 120 (as explained above with respect to processing of the event data collector 121 in the protected site 120). As noted above, since the event data collector 121 in the protected site 120 initiates the event connection 107 as a TCP connection, for example, to the proxy site 110, the event processor 150 in the proxy site 110 does not itself initiate or enter or otherwise begin a control session with the protected site 120 on its own, but rather waits for incoming protected site event connections 107. Further details of processing operations that the event processor 15 performs in step 210 to establish an event connection 107 will be explained shortly with respect to the flow chart of processing steps illustrated in FIG. 4.

Returning attention to FIG. 3, in step 211 event processor 150 receives, over the event connection 107, event data 192 associated with an event tracker device 180-2 (i.e., in event sensor 180) operating within the protected site 120.

In particular, as shown in sub-step 212, the event processor 150 continually receives and stores, in the event database 140 within a proxy site 120, the stream of event data 192-1 through 192-N over the event connection 107 initiated from the protected site. In this example, the event data 192 represents continual acquisition of event information by the event tracker device 180-2 in response to the sensor device 180-1 that detected the event 185 occurring in the protected site 120. In other words, in this example the sensor device 180-1 activates (or causes activation of) the event tracker device 180-2 to continually acquire the event data 187-1 and to provide the event data 192 as individual TCP/IP packets over the event connection 107 to the proxy site 110. By continuously receiving and storing event data 192 at the proxy site 110 (i.e., within the event information database 140) over the event connection 107 from the protected site 120, the proxy site 110 buffers the event data 192 from a beginning of the event 185 while awaiting receipt as will be explained, from a responder site 130, of the next periodic event poll 134 associated with an event notification 172 corresponding to that event data 192.

In step 213 the event processor 150 provides an event data acknowledgement 194 over the event connection 107 to the protected site 120 to acknowledged receipt of the event data 192. As described in the above example, in one embodiment the event processor 150 can provide a respective event data acknowledgment 194 for each event data packet 192 received. In an alternative arrangement, in order to minimize bandwidth utilization of the network 105, the event processor 150 can provide a periodic event data acknowledgment 194 in response to receipt of a certain number of event data packets 192 or in response to a certain amount of time elapsing during continual receipt of the event data 192 (e.g., acknowledge every 20 seconds). In other words, according to alternative embodiment of the invention it is not necessary that each event data packet 192 be specifically acknowledged but rather, the event processor 153 periodically provides event data acknowledgments 194 in response to receiving multiple event data packets 192.

In step 214 the event processor 150 processes the event data 192 for access by one or more responder sites 130. There are various tasks associated with processing event data 192 to provide access to the event data to responder sites 130. Further details of processing operations that the event processor 115 performs in step 214 will be explained shortly with respect to the flow chart of processing steps illustrated in FIG. 5. Generally however, the event processor 150 stores the event data 192 within the event information database 140. In addition, based on event start message processing that will be explained in detail with respect to the flow chart of processing steps illustrated in FIG. 4, the event processor 150 provides the stored event data 192 to particular responder sites 130 that request to receive the stored event data 192.

In step 215 the event processor 150 in the proxy site 110 establishes a responder connection 108 initiated from the responder site 130. As mentioned above, the responder sites 130 are responsible for initiating communication with the proxy site 110 in order to determine if there have been any events 185 that have occurred for a protected site 120 that are of interest to the responder sites 130. To do so, the responder sites 130 initiate responder connections 108 in order to provide periodic event data request poll messages 134 to the proxy site 110, as will be explained. The event polls 134 can identify a particular protected site 120.

In step 216 the event processor 150 in proxy site 110 receives, over the responder connection 108, an event data request 134 (i.e., a periodic event poll 134 in the illustrated example in FIG. 1) associated with the protected site 120. Details of processing operations performed in step 216 by the event processor 150 operating in the proxy site 110 will be explained shortly with reference to the flow chart of processing steps illustrated in FIG. 6.

In step 217, in response to receiving the event data request 134, the event processor 150 generally provides the event data 192, received from the protected site 120 over the event connection 107, to the responder site 130 over the responder connection 108. Complete details of processing operations performed in step 217 by the event processor 150 operating in the proxy site 110 will be explained shortly with reference to the flow chart of processing steps illustrated in FIG. 7.

In this manner, the aforementioned high-level processing operations that the event processor 150 performs in the proxy site 110 as illustrated in FIG. 3 allow the proxy site 110 to operate as an intermediary or central go-between proxying device in order to receive event data transmitted from the protected site 120 and in order to store this event data 192 for access by responder sites 130 that periodically request the availability of event data related to the protected sites 120 that the responder site 130 is responsible for monitoring. Specific details of these processing operations will be explained with respect to the flow chart illustrated in FIGS. 4 through 7.

Figure 4:
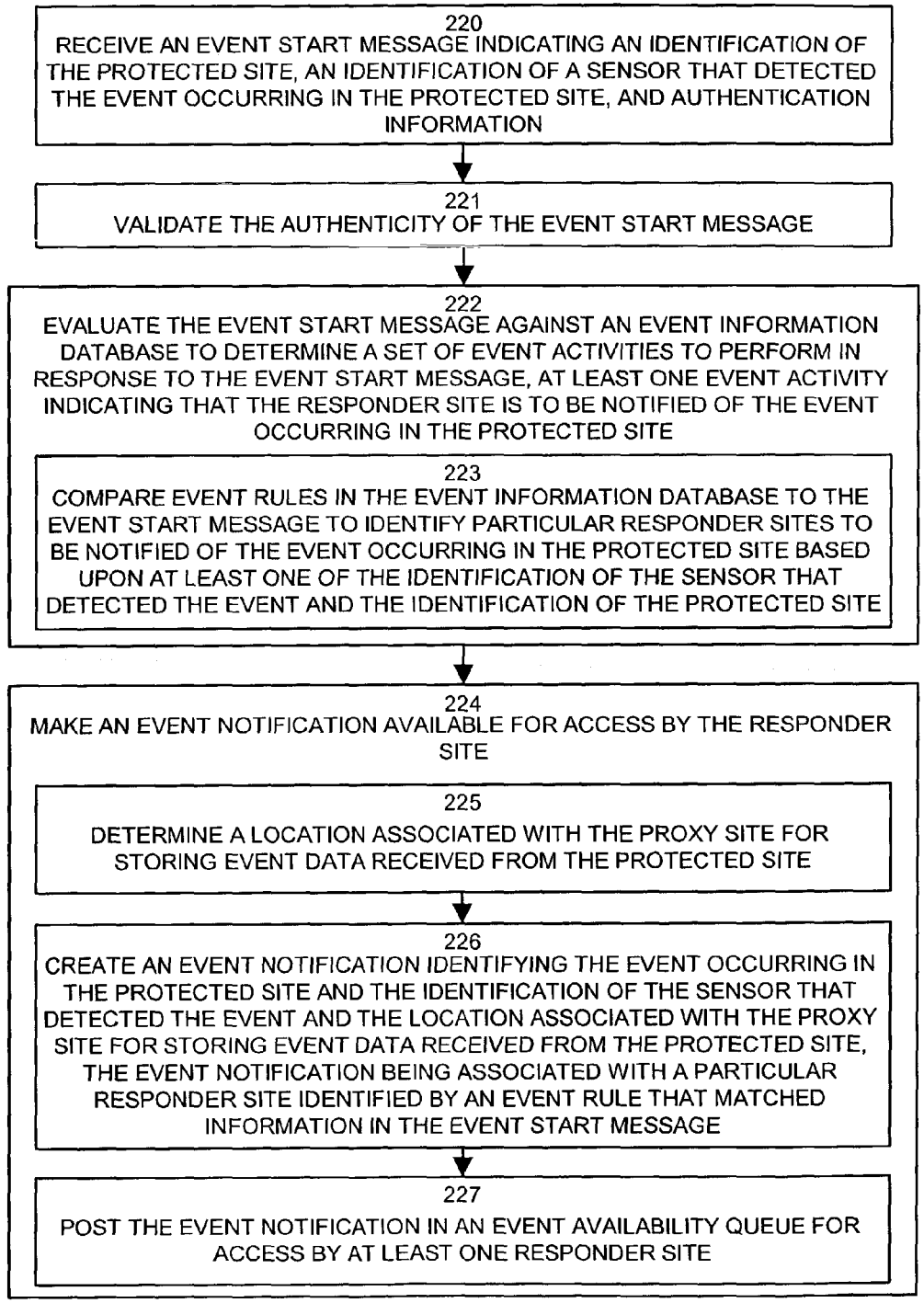
FIG. 4 is a flow chart of processing steps that an event processor operating in a proxy site performs to establish an event connection initiated by a protected site in accordance with one example embodiment of the invention.

FIG. 4 is a flow chart of processing steps that illustrates details of operations performed by the event processor 150 during establishment of an event connection 107 for receipt of event data 192 from the protected site 120 to the proxy site 110. In other words, FIG. 4 is a flow chart of processing operations performed within step 210 discussed above in FIG. 3 to enable establishment of an incoming event connection 107 to obtain event data 192. In this example, the event connection 107 operates over a connection-oriented protocol such as TCP/IP in the communications network 105.

In step 220, the event processor 150 receives an event start message 192 indicating an identification of the protected site 120, an identification of a sensor 180-1 that detected the event 185 occurring in the protected site 120, and authentication information such as a digital signature or certificate and/or public or symmetric key encryption information contained within the event start message 192.

In step 221, the event processor 150 utilizes the information within the event start message 192 in order to validate the authenticity of the event start message 192. This can include validating a certificate or digital signature contained within the event start message 192 and can also include decrypting any information contained within the event start message 192 using a public key associated with the protected site 120.

In step 222 the event processor 150 evaluates information within the event start message 192 against an event information database 140 (e.g., against event rules 193, as will be explained) to determine a set of event activities to perform in response to the event start message 192. One such event activity indicates that one or more responder sites 130 are to be notified of the event 185 occurring (or that has already occurred) in the protected site 120.

In particular, in sub-step 223, the event processor 150 compares a set of event rules 193 in the event information database 140 to the event start message 192 to identify particular responder sites 130 to be notified immediately and automatically of the event 185 occurring in the protected site 120 based upon, for example, the identification of the sensor 180-1 that detected the event and the identification of the protected site 120. As an example, if the identification of the event sensor within the event start message 190 indicated that a fire alarm sensor was triggered due to a heat, fire or smoke detection event 185, the event rules 193 in the event information database 140 can indicate that a fire department or other emergency responder site(s) 130 should be notified of the event 185 occurring at the protected site 120. As another example, if the event 185 triggered a burglar alarm sensor 180, the event processor 150 can compare the identity of the sensor 180 in step 223 to the event rules 193 to identify particular responder sites 130 such as the Police Department or the owner of the protected site 120 of the occurrence of a burglary in progress at the protected site 120.

It is to be understood that these are examples only and that those skilled in the art should understand that there can be many other types of responder sites 130 in particular situations in which one or more responders should be notified about the occurrence of particular events. The event rules 193 can be used to express a relationship between types of event and types of event sensors 180 that are triggered and in response to such actions, can identify the identity of particular responder sites to be notified. Those skilled in the art will understand that there can be numerous formats to event rules 193. As an example, event rules can be of the form:

IF EVENT_TYPE="FIRE" THEN NOTIFY "FIRE_RE-SPONDER_SITE_1"

This example indicates a simple relationship that indicates that a certain fire department should be notified of a fire event at a certain protected site 120. An alarm system designer can create event rules that may be more complex and can contain many contingent requirements before a responder(s) is selected. In addition, a system designer can utilize the event rules 193 to express an order of timed notification to particular multiple responder sites 130 in situations in which multiple responder sites are to be notified of a particular event or a particular sequence of event that may occur within a protected site 120.

Accordingly, a system designer who creates or models the security system for a particular protected site 120 can structure the event rules 193 to require that, for example, more than just one event sensor 180 be triggered prior to notification of a responder site or may require that event sensors 180 be triggered in a particular order thus prompting notification of certain responder sites whereas a different event sensor order of the triggering of event sensors in response to one or more event 185 requires notification of another group of responder sites 130. Embodiments of the invention thus provide optimum flexibility to design in certain requirements and provide for ease and flexibility of modification of the system.

The order of responder site notification as defined in event rules 193 can also indicate the timing at which to notify particular responder site 130. As an example, if an event 185 occurs such as a burglary, the event processor 150 can determine that the event rules 193 indicate that a Police Department responder site 130 is to be initially contacted and that if the event is not cleared within ten minutes, that a second responder site 130 such as the owner of the protected site 120 is to be thereafter be notified. It is to be understood that these are examples only and embodiments of the invention are not limited as such.

In step 224, once the event processor 150 has compared event information within the event start message 190 to the event rules 193 to determine which particular responder sites 130 are to be notified of the occurrence of the event in which particular order, the event processor 150 makes an event notification 172 available for access by the responder site(s) 130.

Processing sub-step 225 through 227 illustrate example processing operations performed according to one embodiment of the invention in order to make an event notification 172 available for access by one or more responder sites 130 by utilizing an event availability queue 170 that the event processor 150 maintains within the proxy site 110.

In particular, in step 225 the event processor 150 determines a location associated with the proxy site 110 for storing event data 192 received in the protected site 120. In other words, in step 225 the event processor 150 determines the location at which the stored event data 192 is to be referenced (i.e., where this data is currently being stored within the event information database 140). The location for storing event data 192 maybe for example, a uniform resource locator (URL) referencing a file within a storage facility associated with the proxy site 110 that if accessed, provides access to the stored event data 192.

In step 226, the event processor 150 creates an event notification 172. An event notification 172 identifies the event 185 occurring in the protected site 120 and further identifies the identification of the protected site 120 and the sensor 180 (or sensors) that detected the event (and that are being used to capture the event data, such as event tracking camera device 182 in the illustrate example of FIG. 1). In addition, the event notification 172 can identify the location associated with the proxy site 110 for storing the store event data 192 (e.g., the URL of the event data file 192). In this example embodiment, the event notification 172 is associated with (i.e., will be reported to) a particular responder site 130 identified by one or more event rules in event rules 193 that matched information in the event start message 190 associated with the particular event 185. Accordingly, the event processor 150 creates, in this example embodiment, a separate event notification 172 for each responder site 130.

Next, in step 227 the event processor 150 posts the event notification 172 within the event availability queue 170 for access by one or more of the responder sites 130 (i.e., via periodic event polls 134 provided from those responder sites, as will be explained). In this manner, embodiments of the event processor 150 provide a mechanism to determine which responder sites to be notified of which events and can create event notifications 172 for these responder sites which are placed into an event availability queue 170 for subsequent access by responder sites 130 which periodically poll the proxy site 110.

Figure 5:
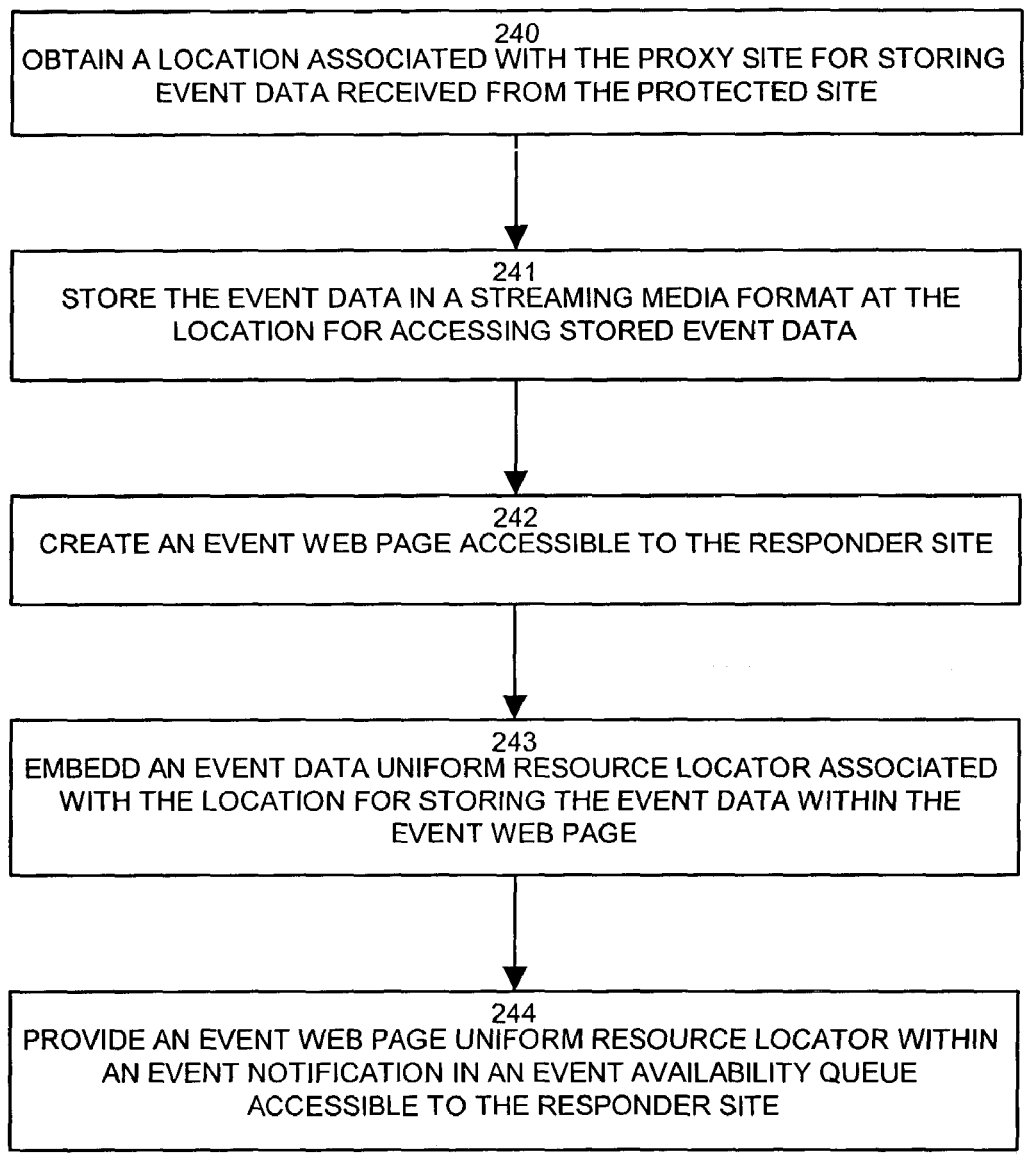
FIG. 5 is a flow chart of processing steps that an event processor operating in a proxy site performs to process event data for access by a responder site in accordance with one example embodiment of the invention.

FIG. 5 is a flow chart of processing steps that illustrates details of processing operations performed by the event processor 150 in order to process event data 192 received from the protected site 120 for access by the responder sites 130. In other words, the flow chart of processing steps in FIG. 5 illustrates details associated with processing step 214 of the flow chart in FIG. 3. Generally, the event notifications 172 contain a reference 177 to an event web page 175 that a responder site 130 can reference (i.e., can use a HTTP GET request) to access. The event web page 175 (referenced by a responder from the URL 177 in the event notification 172), as will be explained, contains another URL 176 that references the stored event data 192. Further processing of these details of embodiments of the invention will be explained in the following processing steps 240 through 244.

In step 240, either upon receipt of the initial event start message 190 or in response to receipt of the first event data message 192, the event processor 150 obtains or creates a location associated with the proxy site 110 for storing the event data 192 that is being received from the protected site 120. This may include creating or allocating a storage area within a disk or file server system coupled to the proxy site 110 within the event information database 140 for storing event data 192 associated with a particular event identified by an event start message 190.

In step 241, once the event processor 150 has identified a location for storing the event data 192, the event processor 150 stores the event data 192 in a streaming media format at the location for accessing stored event data (i.e., within the event information database 140).

In step 242 the event processor 150 creates an event web page 175 accessible to the responder site 130. As will be explained, the event web page 175 will allow one or more responder sites 132 access to the event data 192 via accessing a uniform resource locator 176 that references the location for storing event data 192 within the event information database 140.

In step 243 the event processor 150 embeds an event data uniform resource locator (URL) 176 associated with the location for storing the event data 192 within the event web page 175. Accordingly, when a responder site 130 accesses the event web page 175, the responder site 130 can reference the URL 176 associated with a location of the stored event data 192 for access to the event data 192.

In step 244 the event processor 150 provides (e.g., embeds) the event web page uniform resource locator 177 within the event notification 172 in the event availability queue 170 accessible to the responder site 130. This allows a responder site computer system 130 access to the event web page 175 (as will be explained shortly) and further allows access, via the URL 176, to retrieve the stored event data 192.

Figure 6:
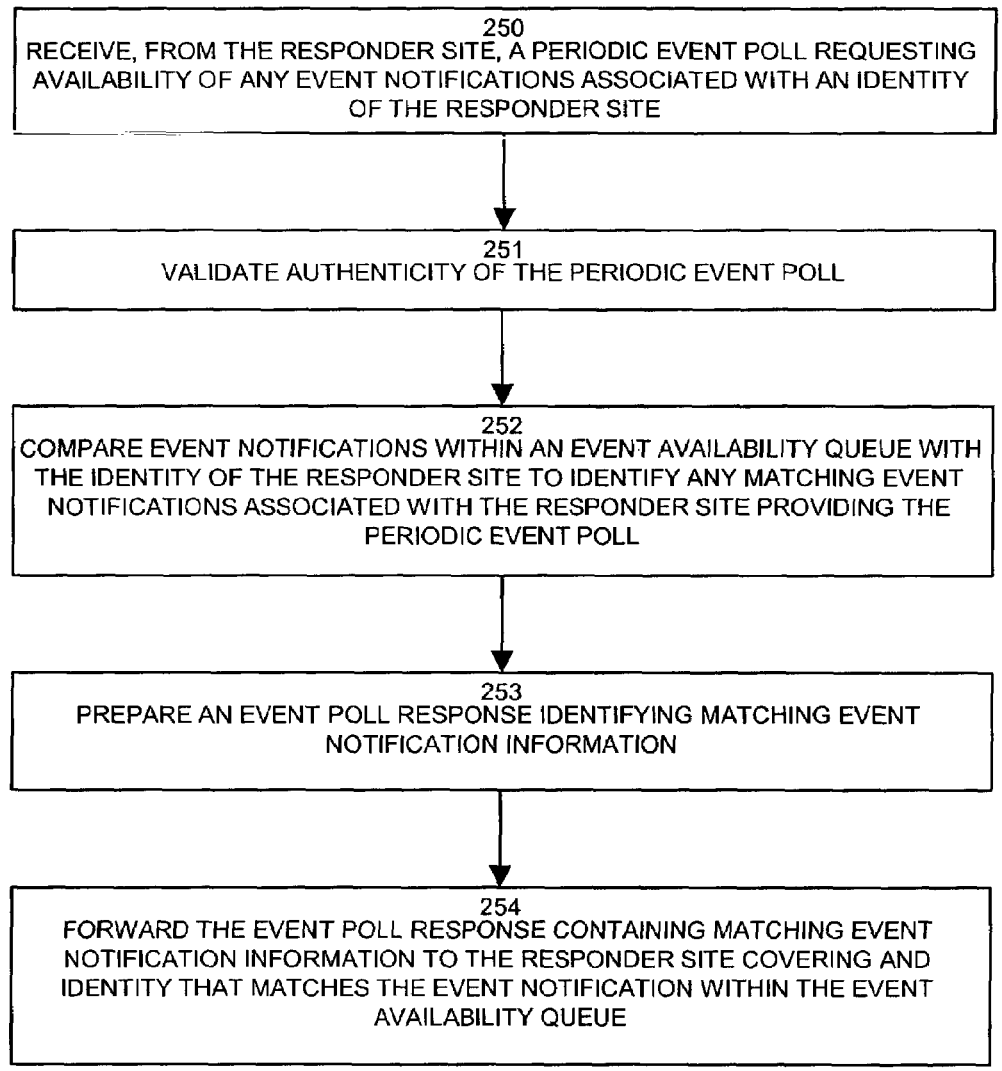
FIG. 6 is a flow chart of processing steps that an event processor operating in a proxy site performs to receive an event data request in the form of an event poll in accordance with one example embodiment of the invention.

FIG. 6 is a flow chart of processing steps that illustrate processing operations that the event processor 150 performs to receive, from a responder site 130 over a responder connection 108, any event data requests (e.g., a periodic event poll 134) associated with a particular protected site 120. In other words, the processing steps illustrated in the flow chart in FIG. 6 describe one example embodiment of details of processing of step 216 from the flow chart discussed above in FIG. 3.

In step 250, the event processor 150 operating in the proxy site 110 receives, from the responder site, a periodic event poll 134 requesting availability of any event notifications 172 associated with an identity of the responder site 130 (e.g., for a particular protected site 120 that the polling responder site 130 identifies and is authorized to access event data). Recall from the aforementioned discussion of the flow chart of processing steps in FIG. 4, the event notifications 172 existing within the event availability queue are associated with particular responder sites 130. The event processor 150 receives the event start message 190 and processes each event start message 190 against the set of event rules 193 to produce each event notification 172 for particular responder sites 130.

In step 251 the event processor 150 validates the authenticity of the periodic event poll 134. This can involve confirming a digital signature or certificate contained within the periodic event poll 134 as provided from a particular responder site 130 in order to authenticate the identity of the responder site providing the periodic event poll 134. This can also involve decrypting the content of the periodic event poll 134 using, for example, a public key of the responder site 130.

Next, in step 252 the event processor 150 compares event notifications 172 within an event availability queue 170 with the identity of the responder site (as specified within the periodic event poll 134) to identify any matching event notifications 172 associated with the responder site 130 providing the periodic event poll 134. That is, the periodic event poll 134 received from a particular responder site can identify that responder site 130 and that identification can be compared to the event notifications 172 within the event availability queue to identify events associated with particular responder sites 130. Alternatively, the event processor 150 can match or compare a combination of responder site identification and protected site identification (i.e., that the responder site is tasked with and is authorized to monitor) from the event poll response 134 to information associated with each event notification 172 to determine any matching event notification 172 awaiting receipt by a particular responder site 130.

In step 253, for any matching event notifications 172, the event processor 150 prepares an event poll response 136 identifying matching event notification information 172. In one example embodiment of the invention, in step 253 the event processor 150 includes a URL 177 from the matching event notification 172 (a URL of the event Web Page 175) within the event poll response 136 that will allow the responder site 130 access to the web page 175 which in turn contains the URL 176 to the stored event data 192 associated with that event notification 172 that matched the responder and/or protected site identification(s) requested in the periodic event poll 134.

In step 254, after creation of the event poll response 136, the event processor 150 forwards the event poll response 136 containing matching event notification information 172 (e.g., containing URL 177 to the event web page 175) to the responder site 130 having an identity that matches the event notification 172 within the event availability queue 170 (and that matches the formerly received event poll 134). In this manner, responder sites 130 are provided with the event poll responses 136 in response to event polls 134 to allow an event monitor application 132 operating within the responder site computer system 130 to retrieve access to the stored event data 192, as will be explained shortly).

Figure 7:
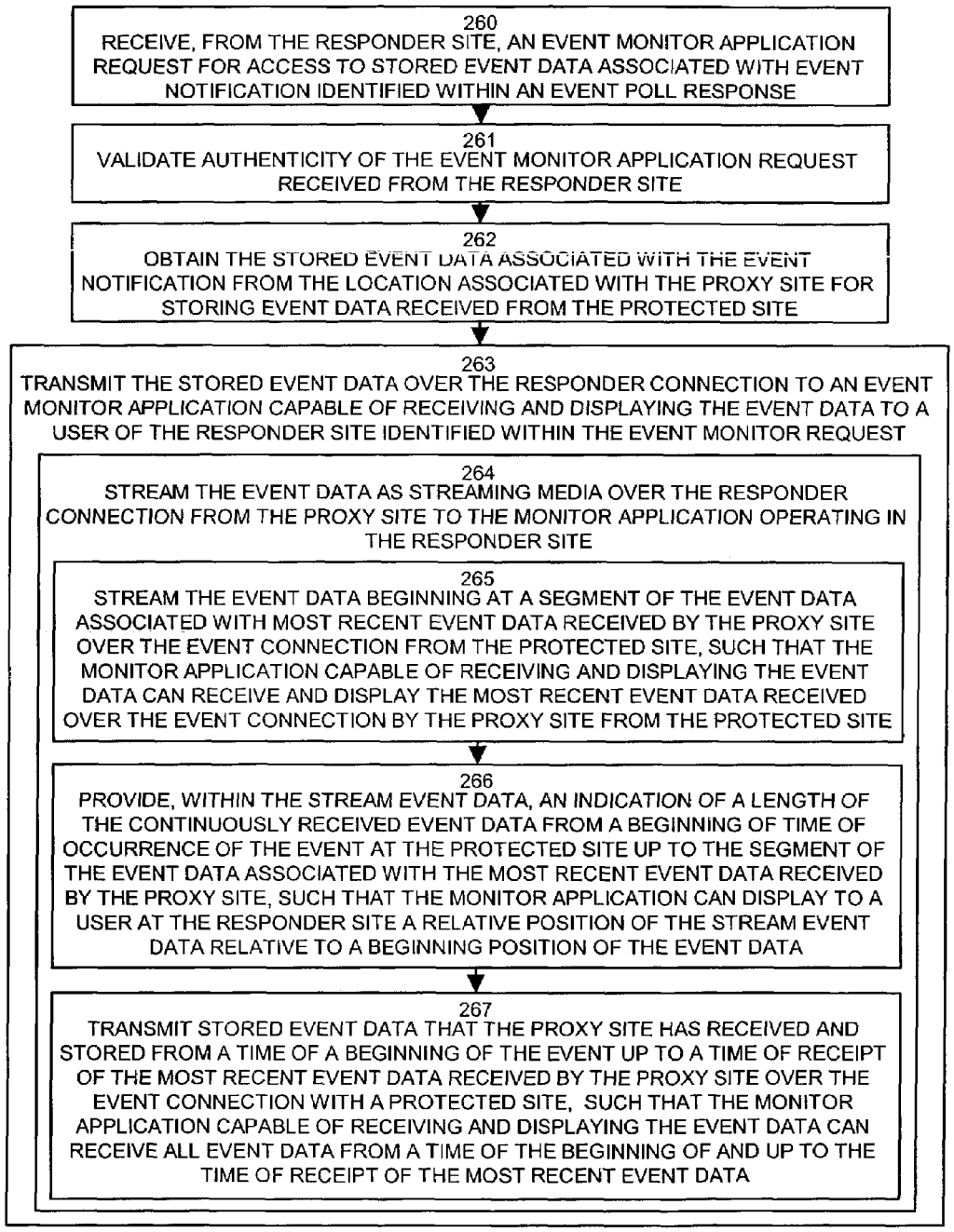
FIG. 7 is a flow chart of processing steps that an event processor operating in a proxy site performs to provide event data to a responder site in accordance with one example embodiment of the invention.

FIG. 7 is a flow chart of processing steps configured according to one example embodiment of the invention that show details of processing performed by the event processor 150 in order to provide a stream of event data 142, received from the protected site 120 over the event connection 107 (stored in the proxy site 110 as stored event data 192), to the responder site 130 over the responder connection 108. In other words, processing steps illustrated in the flow chart in FIG. 7 show details of processing step 217 from the flow chart of processing steps in FIG. 3.

In step 260, the event processor 150 receives, from the responder site 130, an event monitor application request 141 for access to the stored event data 192 associated with the event notification 172 identified within the event poll response 136 (received by the responder site 130 as explained above). In other words, when the responder site 130 provides a periodic event poll 134 and receives, in response, an event poll response 136 identifying a particular event notification 172 and references the web page via URL 177 (contained in the event poll response 136), the responder site 130 is made aware that there is stored event data 192 associated with an event that has occurred in the protected site 120 that is "associated" with this responder site 130. By "associated", what is meant is that the responder site 130 is responsible for monitoring events and reviewing event data 192 generated in response to events 185 for one or more particular protected sites 120. Accordingly, when the responder site 130 receives an event poll response that indicates an event notification 172 (i.e., that contain the URL 177 in one example embodiment), the responder site 130 can activate the event monitor application 132 for accessing and viewing the stored event data 192. This can involve providing the URL 177 of the event web page 175 (received by the responder site 130 in the event poll response 136) to the event monitor application that can operate as a web browser or other data access application and can reference the URL 177. The event monitor application 132 can thus provide an event monitor application request 141 (e.g., an HTTP GET request to the URL 177, referencing the event web page 175) for access to the stored event data 192 which the event processor in-step 260 receives within the proxy site 110.

The monitor site 130-1 thus receives a poll response 136 with a URL and other identifying information sufficient to gain entry and access to the specific event data on the proxy. In one embodiment of the invention, the client responder site 130-2 in contrast receives a notification of available event data by some communications means, such as an email message which contains a URL specific to that client responder site 130-2 for a specific web page which in turn embeds the URL to the specific URL resource (i.e. a file download) which contains the identifying information sufficient to gain entry to the specific event data on the proxy. In step 261, the event processor 150 validates authenticity of the event monitor application request 141 received from the responder site 130. This can include validating a certificate or digital signature of the responder site 130 and can further include decrypting information within the event monitor application request 141 using a public or symmetric key or other encryption information associated with the responder site 130.

Next, in step 262 the event processor 150 obtains the stored event data 192 associated with the event notification 172 (i.e., referenced by the event monitor application request 141) from the location (e.g., in a file or web server) associated with the proxy site 110 for storing event data 192 that was received from the protected site 120. In other words, in step 262 the event processor 150 operates in one example embodiment of the invention as a server in order to serve the requested stored event data 192 requested within the event monitor application request 141 back to the responder site 130.

In step 263 the event processor 150 transmits the stored event data 192 over the responder connection 108 to the event monitor application 132 which is capable of receiving and displaying the event data 192 to a user 131 of the responder site 130 identified within the event monitor application request 141. In other words, in step 263 the event processor serves the stored event data 192 back to the event monitor application 132 operating within the responder site computer system 130 that then presents (e.g., plays or displays) the stored event data 192 to the responder user 131 operating the event monitor application 132. The responder user 131 maybe, for example, a police officer, security personnel, a firefighter, a dispatcher or other person responsible for acting on event data based on viewing its contents in order to provide any required security for the protected site 120.

Processing sub-steps 264 through 267 illustrate details of processing that the event processor 150 performs in order to transmit the stored event data 192 from the proxy site 110 to the responder site 130 for receipt by the event monitor application 132 in accordance with one example embodiment of the invention in which the event data 192 is streaming media data, such as digital video or audio or a combination of such data formats.

In step 264, the event processor 150 streams the stored event data 192 as streaming media over the responder connection 108 from the proxy site 110 to the event monitor application 132 operating in the responder site 130. In this example embodiment then, the event data 192 is conveyed in a streaming media format such as audio data, video data or a combination thereof. Sub-steps 265 through 267 explained details of processing according to one example embodiment of the invention in order to stream event data as streaming media over the responder connection 108 from the proxy site 110 to the responder site 130.

In step 265, the event processor 150 streams 142-1 through 142-N the event data 192 beginning at a segment of the stored event data 192 associated with most recent event data received by the proxy site 110 over the event connection 107 from the protected site 120, such that the event monitor application 132 that is capable of receiving and displaying the event data stream 142 can receive and display the most recent event data portions 192-N received over the event connection 107 by the proxy site 110 from the protected site 120 (as opposed to feeding older event data segments 192-1 through 192-N-1). In other words, in step 265 in this example embodiment of the invention, the event processor 150 immediately begins streaming the most currently received event data 192 that was most recently received at the proxy site 110 from the protected site 120 when the event monitor application sends the request 141 for access to the web page 175. In this manner, the recipient responder user 131 viewing the event data via the event monitor application views the most current event data. In certain situations, it may be the case that a particular responder site 130 is not notified of an event until a period of time has elapsed (e.g., several seconds) after the initial occurrence of the event. Such a delay may occur, for example, if network congestion is present in the network 105.

Accordingly, in such cases, this embodiment of the invention provides that a responder site 130 that is notified of an event after a period of time has elapsed from the beginning of the event (i.e., the several second delay) and thus begins streaming the most recently received and stored event data 192 (i.e., the most recent event data 192 that the proxy site 110 has received) as opposed to having the responder view event data that is somewhat outdated (i.e., from the beginning of the event, that may have occurred several seconds ago).

In another embodiment of the invention, if a segment of event data 192 cannot be transferred to a given responder site 130, perhaps since the data 192 arrives at the proxy site 110, the event processor 150 in the proxy site 110 can store the event data 192 and can later try to send the event data segment again to the relevant responder 130. Each segment of event data 192 has an associated sequence number. Responders sites 130 can maintain a list of data stream packets thus far received in sequence number order and can thus detect missing segments and then request the proxy server to re-attempt delivery of the missing segment at a later point in time. The play back of the stream of event data 142 for the responder user 131 can be performed to not include the missing segment. This is done via the same technique as the 'event leading' backfill technique explained herein, but can occur anywhere in the middle of the event data stream 192/142. Accordingly, it is to be understood that the backfill segment may be a segment of event data from anywhere within the timeline of the entire collection of event data 192 stored within the proxy site 110 thus far.

It is to be understood that this is only one example embodiment, and other embodiments can begin streaming the event data at different stored event data locations, such as from the beginning of the event data 192. In yet another alternative embodiments of the invention, the position within the event data 192 at which point the event processor 150 begins streaming the event data can be determined based on the type of event occurring. As an example, if the event is a fire, then the event processor can decide to stream the stored event data 192 beginning from its most recent frame set thus providing the responder site 130 with the most up to date status of the fire area (i.e., indicating how much the fire has currently spread in the surrounding area, as indicated, for example, by video of that area being captured form the camera sensor 182-1). Alternatively, if the event is a burglary, then the event processor 150 can begin streaming the event data 192 from the very beginning, thus providing event data 192 to the responder site 130 that shows the event 185 right at the time of triggering the capture of the event data 187 by the video camera sensor 180. This might allow the responder site 130 to see the burglar in action (e.g., passing in front of the camera) as opposed to viewing the most recent event data that may be several seconds old and thus the intruder 189 may now be out of sight of the camera (e.g., may have moved into another area of the protected site 120, out of view of the camera sensor 180-2). Accordingly, depending upon the nature of the event, as indicated by the event type, the event processor 150 can determine from which location to stream the event data 192.

In step 266, in embodiments that do not begin streaming, for example from the beginning of the event data, the event processor 150 in these embodiments of the invention also provides, within the stream of event data 142, an indication of a length of the continuously received event data 192 from a beginning of time of occurrence of the event at the protected site up (i.e., beginning with event data segments 192-1) to the segment of the event data associated with the most recent event data received by the proxy site (i.e., the most recent event data segments 192-N), such that the event monitor application 132 can display to a user 131 at the responder site 130 a relative position of the stream of event data 142-N (i.e., the newest event data segment) relative to a beginning position of the event data 142-1 (i.e., the first event data segment). In this manner, the event processor 150 can embed or otherwise transmit other information within the stream of event data 142 that can include, for example, the total length of the event data stream related to this particular event. The event monitor application 132 can utilize information to graphically display or convey to thsponder user 131 where in the stream of event data 142 the responder user 131 is currently viewing event data. This can be conveyed to the responder user, for example, by providing a timeline of event data that indicates a position relative to the start of the stored event data 192 at which the responder user 131 is currently viewing the current segment or frame of event data on a display of the responder site computer system 130.

Likewise, in embodiments that begin streaming the event data 192 (as stream 142) from the beginning of the event data 192 (for example, in the case of a burglary event), there may be more event "real-time" or more current event data 192 still arriving at the proxy site, even though the proxy site 110 is streaming event data 142 to the responder site 130 that is older (e.g., from the beginning of the event). In such cases, the event processor 150 can include, in the event data messages 142, an indication of the total length of time or the total amount of event data received by the proxy site thus far, and the event monitor application 132 in the responder site 130 can provide (e.g., display) this to the responder user 131. This allows the responder user 131 to quickly gain an understanding of where in the entire stream of event data the currently "playing" view of event data exists. In other words, by providing an indication of the time or total length of event data collected in response to the event 185, the event monitor application 132 can use this information to indicate to the user 131 where in that entire stream the event data 142 (i.e., the event data 142 that the user is actually observing at that moment) exists.

In step 267, the event processor 150 in this embodiment of the invention also transmits (i.e., concurrently) stored event data 192 that the proxy site has received and stored from a time of a beginning of the event (i.e., starting at event data segment 192-1) to a time of receipt of the most recent event data (i.e., up to the current event data segment 192-N) received by the proxy site 110 over the event connection 107 with a protected site 120. In this manner, the event monitor application 132 can receive all stored event data 192 from a time of the beginning of and up to the time of receipt of the most recent event data.

As an example, if the event were a fire and the event data stream 142 contained the most recently received event data, according to this embodiment of the invention, in step 267 the event processor 150 can begin to backfill or otherwise provide stored event data segments 192-1 through 192-N–1 (embedded within the stream 142, but not presently shown to the user 131 on the graphical display of the responder site computer system 130) to thus provide the responder site 130 with old or somewhat outdated event data in comparison to the current stream of the most recent event data initially presented to the responder site. Using the fire example, the old event data might be video data recorded early in the fire when the first smoke detector went off. Accordingly, in the case of a fire event, the event monitor application 132 initially receives a stream of event data beginning with the most recently received event data segment 142-N and progressing forward in time with each newly received segment of event data 192-N+1 that the event data collector 121 transmits from the protected site 120 to the proxy site 110 which the event processor 150 then forwards as event data segment 142-N+1 to the responder site 130. This processing has the effect of initially presenting to the responder user 131 the most up-to-date event data (i.e., the current state of the fire area) while at the same time transmitting other (i.e., earlier) event data segments beginning with the initial or first event data segment 142-1 (corresponding to the first event data segment 192-1 received from the protected site 120 at the start of the event) and successively increasing or leading up to the event data segment 142-N that the responder user was initially presented.

The event monitor application 132 is capable of buffering the older event data segments 142 (or newer ones in embodiments wherein the early event data is presented to the user first) at the same time as presenting to the user to current stream in real-time of the most recent event data segments being forwarded from the protected site 120 through the proxy site 110 to that responder site 130. By backfilling or providing the older (or newer, in some cases) event data segments in this manner, if the responder user 131 decides to view earlier (or newer) event data, that user can rewind (or fast-forward) to review older (or newer) event data as opposed to having to continuously view the initially displayed event data stream. To this end, the event monitor application 132 eventually receives the entire set of stored event data 192 from event processor 150 which thus allows the responder user 131 to review the entire set of captured event data from a particular event tracker device such as the camera sensor 180-2 illustrated in FIG. 1. However, depending upon the bandwidth of the network 105 and the quality (e.g., data density) of the event data 192, it may take several seconds or even minutes to transfer the entire stored event data 192 to the responder site 131. Accordingly, by having the event data stream 142 begin at certain locations such as the beginning or the end (i.e., most recent), based on event type, the responder user 131 is directed to the most important portion of event data based on probability of that event data conveying interesting information to the user 131.

Using the burglary example noted above, if the burglar 189 (i.e., intruder in FIG. 1) is armed with a weapon and this is caught on camera 180-2 when that intruder 189 trips the sensor 180-1, by presenting the responder user 131 with older event data first, that responder can more quickly ascertain a proper course of action, such as calling in police and indicating an armed robbery is in progress, as opposed to viewing event data at its current or real-time position at which time the intruder 189 is no longer in view of that camera 180-2.

Based on the foregoing description of embodiments of the invention, the event processor 150 operating in conjunction with the event data collector 121 and the event monitor applications 132 operating in one or more responder site computer systems 130 provide a unique security and surveillance system which is activated within the protected site 120 and that allows a responder user 131 to view event data in an efficient, unique and secure manner. Since the protected site 120 initiates all outbound connections 107 and disallows incoming connections of any type over the computer network 105, the security of the protected site is greatly enhanced.

In addition to the aforementioned features of embodiments of the invention explained thus far, other embodiments of the invention provide alternative arrangements that may be combined alone or in conjunction with the aforementioned embodiments. In particular, embodiments of the invention allow a responder user 131 controlling an event monitor application 132 to provide a work item 144 that the event monitor application can insert into a periodic event poll 134 (or into an event data request 141) received by the event processor 150 operating in the proxy site 110. The work item 144 can contain a command to be performed by one or more sensors 180 under control of event data collector 121 within the protected site 120. As briefly explained above with respect to operation of the event data collector 121 in the flow chart of processing steps in FIG. 2, work items 144 of this nature can be inserted as piggyback commands into the event data acknowledgements 194-1 through 194-N sent from the event processor 150 in the proxy site 110 to the event data collector 121 in the protected site 120.

Figure 8:
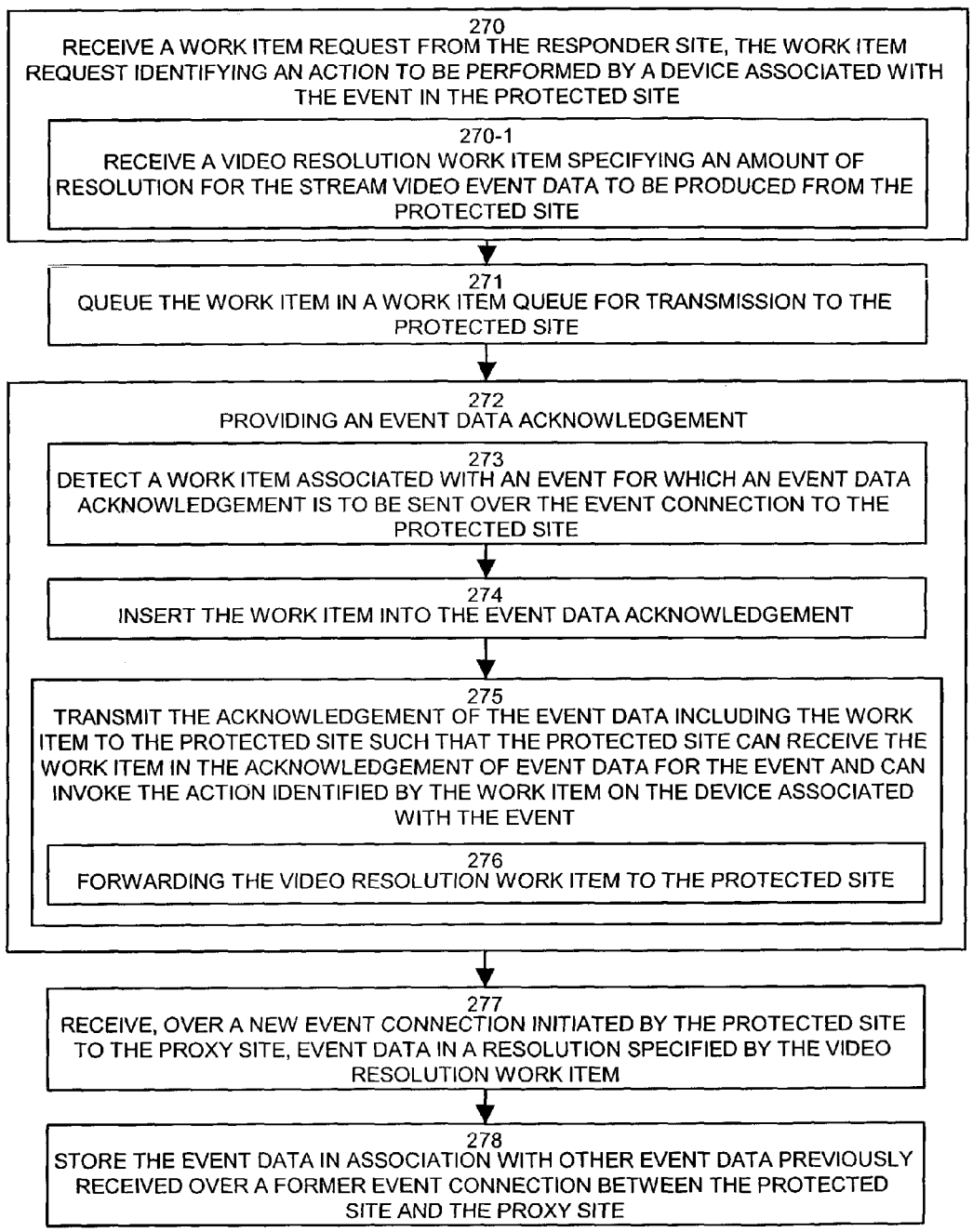
FIG. 8 is a flow chart of processing steps that an event processor operating in a proxy site performs to process work items for control of protected site sensor devices by responder sites in accordance with one example embodiment of the invention.

FIG. 8 is a flow chart of processing steps that the event processor 150 performs according to one embodiment of the invention to process work items 144 according to the aforementioned general description and that utilizes the architecture illustrated in FIG. 8.

In step 270 the event processor 150 receives a work item 144 from the responder site 130. The work item 144 identifies an action to be performed by a device such as a sensor 180 associated with an event 185 in a protected site 120. The responder site 130 is aware of the event identifications due to receipt of event poll response messages 136 as explained above.

Sub-step 270-1 illustrates one example of processing performed in which the event processor 150 receives a video resolution work item 144 specifying a requested selection of video be obtained from the protected site 120 in a higher resolution of video. When such a "high resolution" event data request is received as a work item by the proxy site 110, generally the proxy constructs a work item to retrieve the particular segment of data from the protected site at a higher level of fidelity than that which was delivered 'live'. In this embodiment, the resolution of the live data never actually changes but rather, the protected site 120 can issue a new stream of event data for the same event, and the new stream can contain the high resolution video of that event, as captured by the sensors 180.

It is to be understood that this type of work item is shown by way of example only and many other types of work items containing other sensor commands could be specified. In particular, other examples of work items provide that the work item identifies an action to operate a camera within the protected site to perform one or more operations such as a pan operation, a tilt operation, a focus operation, and/or a zoom operation. In another embodiment of the invention the work item 144 identifies an action to otherwise operate a sensor 180 within the protected site to perform an activate operation or a deactivate operation of a sensor device 180.

Generally, the work item 144 can contain any type of command that the event data collector 121 can be configured to apply or forward to a sensor 180 in order to control operation of that sensor 180 within the protected site 120.

In step 271, the event processor 150 queues the work item 144 in a work item queue 148 for transmission to the protected site 120.

In step 272, the event processor 150 performs the processing discussed above to provide an event data acknowledgment 194 from the proxy site 110 to the protected site 120. In this example embodiment of the invention however, the event data acknowledgment 194 includes the work item 144 in order to convey a sensor command to the event data collector 121.

In particular, sub-steps 273 through 276 illustrate processing details performed according to one embodiment of the invention to provide an event data acknowledgment 194 including a work item 144 from the event processor 150 in the proxy site 110 to the event data collector 121 in the protected site 120 for issuance of the work item command 144 to one or more of the sensors 180.

In step 273, the event processor 150 detects a work item 144 associated with an event 185 for which an event data acknowledgement 194 is to be sent over the event connection 107 to the protected site 120. In other words, in step 273, when an event data acknowledgment 194 is about to be sent over the event connection 107 to acknowledge receipt of a portion of event data 192, the event processor 150 checks the work item queue 148 to determine if any work items 144 are to be provided the protected site 120 associated with this flow of event data 192 that it is currently being acknowledged 194.

In step 274, if a work item 141 exists in the work item queue 148 and is associated with this flow of event data 192 that is being acknowledged 194, the event processor 150 inserts the work item 144 into the event data acknowledgment 194.

In step 275 the event processor 150 transmits the event data acknowledgement 194 including the work item 144 to the protected site 120 such that the protected site 120 can receive the work item 144 in the acknowledgement 194 for the event data and can invoke the action or sensor command identified by the work item 144 on the device or sensor 180 associated with the event 185.

As noted above, the work items 144 in an acknowledgement 194 can specify an action that the event data collector 1221 in the protected site 120 is to perform, such as supplying a stream of high-resolution event data associated with an existing event 185.

In an alternative embodiment of the invention, because the event data packet connections 107 may be maintained in existence for an extended period of time, there may be a significant gap between 'opportunities' of the protected site 120 to receive an acknowledgment response 194 (and hence an embedded work item) in embodiments that do not provide frequent acknowledgements 194 of received event data 192 (e.g., in embodiments that provide a single acknowledgement 194 for an entire stream 192 of event data). Accordingly, in an alternative embodiment, the protected site event data collector 121 software can periodically establish a separate event connection 107 to the proxy site 110 in order to makes a request 199 (FIG. 1) to the proxy site 110 for any appropriate work items. This is called a work item request 199. If a work item is available, the event processor 150 returns the waiting work item 144 over the newly established secondary event connection 107 as a response to the work item request 199. In this embodiment then, this work item request message 199 has no specific live event data content and is transferred from the protected site 121 on its own separate event connection 107.

Continuing with the flow chart of processing steps in FIG. 8, in sub-step 276, using the example of the video resolution work item from above (i.e., from sub-step 270-1), the event processor 150 forwards the video resolution work item 144 within the event data acknowledgment 194 to the protected site 120. In this embodiment then, the event data acknowledgements 194 are sent frequently enough so that the event data collector 121 does not have to establish a secondary event connection 107 to send a periodic work item request poll 199.

In sub-step 277, the event processor 150 thereafter receives, over a new event connection 107 (e.g., 107-1, not shown in this example) initiated by the protected site 120 to the proxy site 110, event data 192 in a resolution specified by the video resolution work item 144. In other words, in the example work item 144 which requests a change in resolution to the stream of event data 192, this action triggers the protected site 120 to initiate a new stream of event data 193-1 through 193-M over a separate event connection 107 (in this example above of the invention) that the event processor 150 can receive.

In sub-step 278, the event processor 150 recognizes this new alternative (e.g., higher) resolution stream of video data as being associated with formerly stored event data 192 and proceeds to store the new resolution event data 193 in association with other event data 192 previously received over a former event connection 107 between the protected site 120 and the proxy site 110. It is to be understood that this example embodiment of the invention uses an alternative event connection 107-1 to receive the higher resolution event data in response to processing the work item 144 requesting a change in the video resolution.

Figure 9:
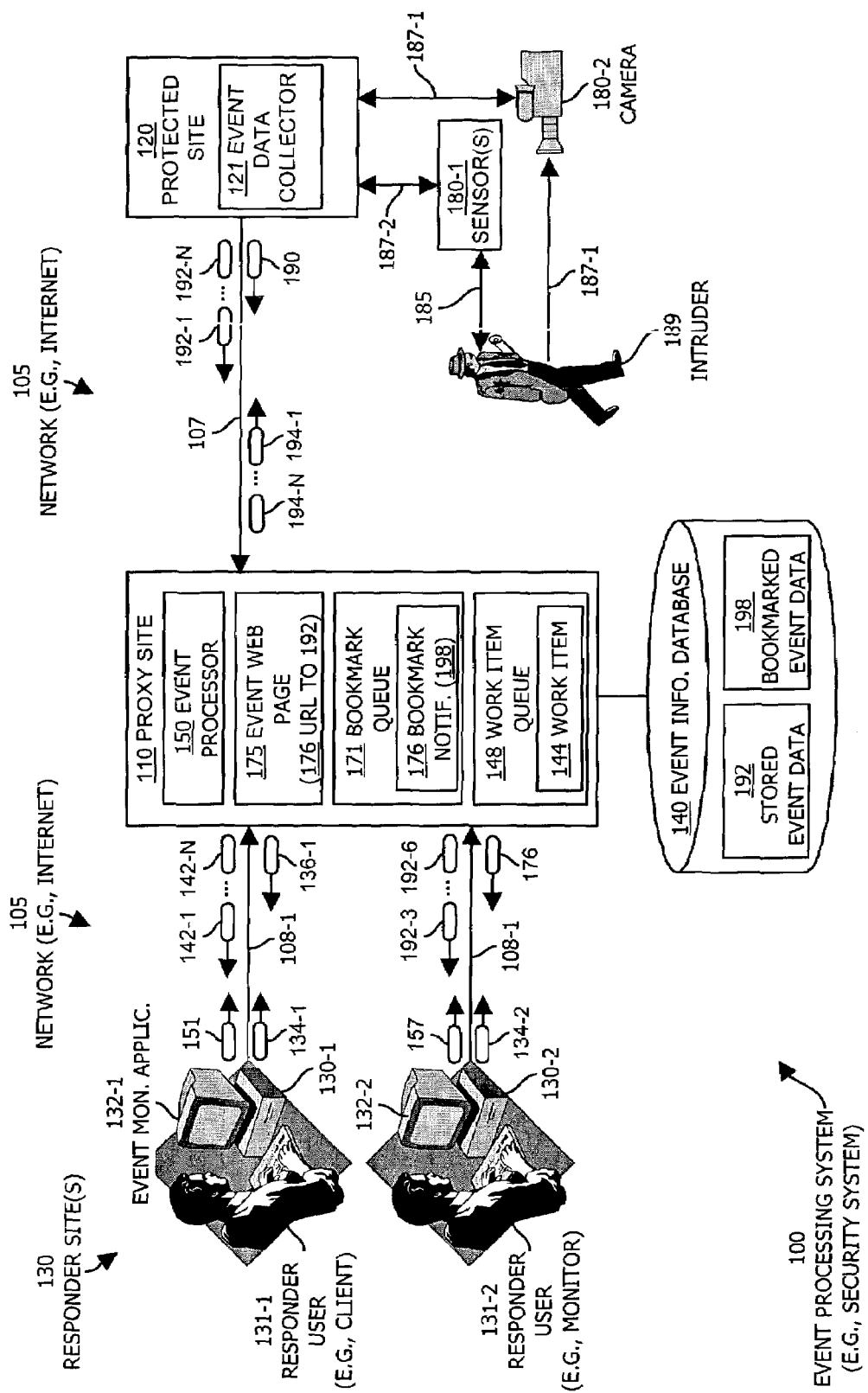
FIG. 9 illustrates another example event processing system configured according to one embodiment of the invention to process bookmark work items.

FIG. 9 illustrates another alternative configuration of an embodiment of the invention that allows support of multiple responder sites 130 and allows the exchange of video data between responder sites 130 using the technique and mechanism referred to herein as a bookmark. The particular features and differences between the architecture illustrated in FIG. 9 and the formerly illustrated architecture in FIG. 1 will be explained during a discussion of processing operations provided by embodiments of the invention to support multiple responder sites using the bookmark techniques explained herein.

Figure 10:
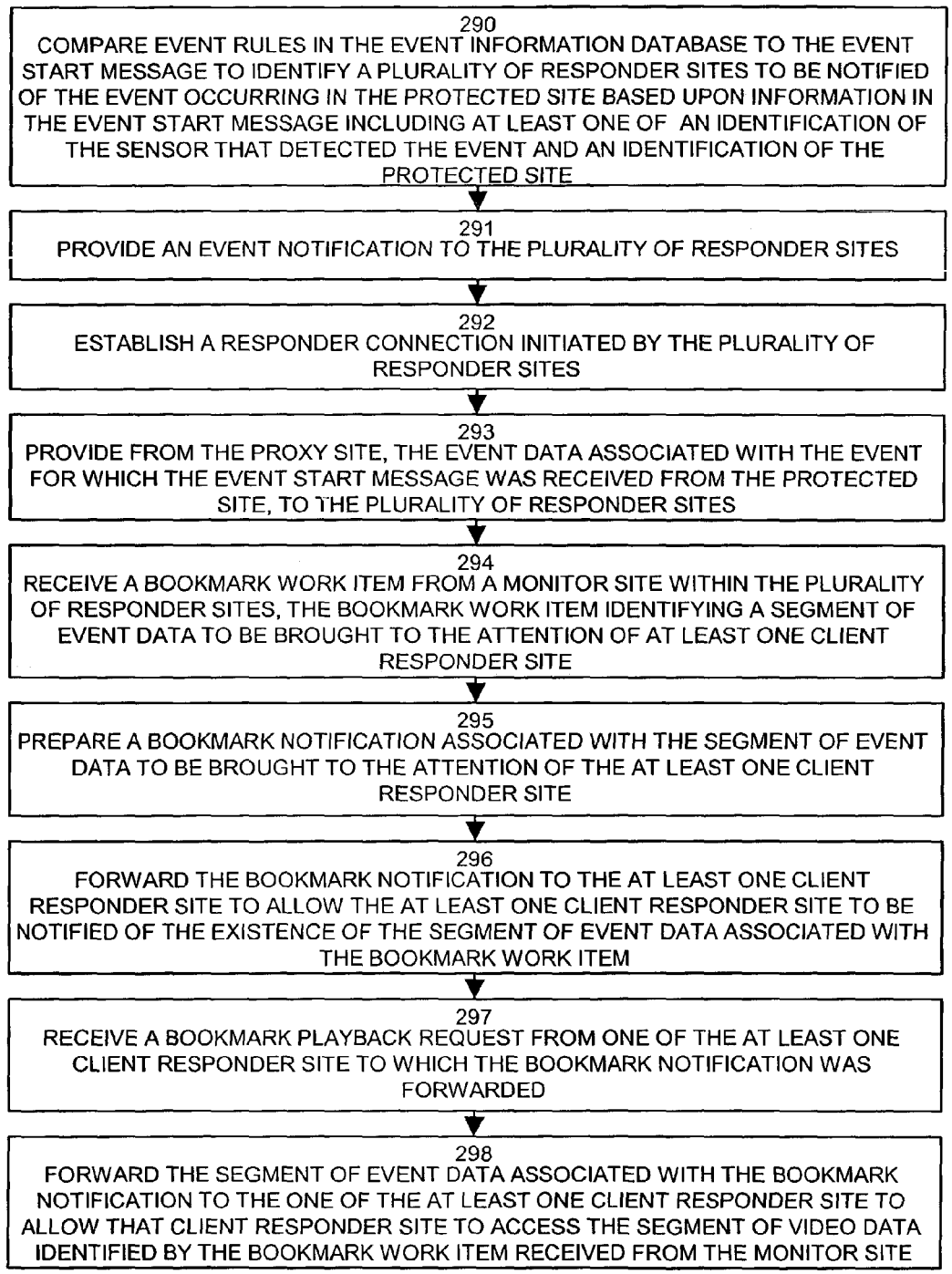
FIG. 10 is a flow chart of processing steps that an event processor operating in a proxy site performs to process bookmark work items in accordance with one example embodiment of the invention.

FIG. 10 is a flow chart of processing steps performed according to embodiments of the invention illustrated in FIG. 9 to support multiple responder sites and to allow a bookmark to be used to exchange event data between responder sites to allow exchange of segments of video data of interest to particular responder users 131.

In step 290, upon receipt of an event start message 190 as explained above, the event processor 150 in the proxy site 110 compares event rules 193 in the event information database 140 to the event start message 190 to identify a plurality of responder sites 130-1, 130-2 and so forth to be notified of the event 185 occurring in the protected site 120 based upon information in the event start message 190. Information in the event start 190 message can include one or more of such things as an identification of the sensor 180 that detected the event and an identification of the protected site 120.

In one embodiment of the invention, a "client" responder 130-2 can be informed of an event by two means: automatic notification and monitor notification. In the automatic case, the event processor 150 compares the event start information 190 against the event rules 193 to determine which responder sites 130 should be notified immediately. The event rules 193 determine, based for example on time, protected site location and the sensor(s) involved in an event indicated in the event start message 190, which responder sites 130 should be notified immediately and by what means notification will be sent. Notification means can include an event notification 172 (detected via periodic event poll messages 134), or other notification means, such as email or instant messages, automated phone calls, or the like. In the case of 'monitor' responder sites 130-1, the monitor responder user 131-1 can receive the initial notification via an event notification 172 and event poll response 136-1. The event poll response can contain information regarding other information related to this event, such as other potential people or responder sites 130 that this responder user 131-1 might desire to contact, depending upon their judgment after reviewing the event data stream 142.

Accordingly, the event poll response data 136, that the event processor 150 transfers to the monitor responder application 132-1 in response to the periodic event poll request 134, can contain a list of other possible responders 130 to potentially contact. The event processor 150 can create this responder list in the event poll response 136 using the event rules 193 in the proxy server 110. The event processor 150 can, in this case, use the event rules 193 to consider a time, location and identify of all of the sensors that have been activated up to that point in the event (rather than just the triggering sensor) to determine a complete set of responders 130 that might be notified of the event and may include this list of potential responders within the single event notification 172 used to notify just one monitor responder site 130-1. Once the monitor responder 130 receives this responder list within the event poll response data 136, the event monitor application 132 can display this list of other potential responder sites related to this event in the protected site and can allow the monitor responder user 131-1 to select not only who should be informed of an event, but also how they should be informed (e.g., phone call, email, instant message or the like).

Accordingly, in the example embodiment described above, the 'client' responders 130-2 are not queued with event notifications 172, but are 'contacted' directly (by either selection method described above) by the responder users 131-1 such as security personnel responsible for monitoring events at a protected site. Once the client responder user 131-2 is notified of an event of interest (e.g., via email, instant message, or other communications), the responder user 131-2 is then responsible operating his or her event monitoring application 132-2 for accessing the event via the URL sent in their event contact (e.g., in an email, instant message, etc.).

Continuing with the flow chart in FIG. 10, in step 292 the event processor 150 establishes a responder connection 108 initiated by one of the responder sites 130-1 in response to an event poll response 134-1 from that responder site 130-1.

In step 293 the event processor 150 provides from the proxy site 110, the event data 142 associated with the event 185 for which the event start message 290 was received from the protected site 120 to each of responder sites 130.

In step 294, in this example embodiment of the invention, the event processor 150 can receive a bookmark work item 151 from a monitor site (e.g., responder site 130-1) within the plurality of responder sites 130. The bookmark work item 151 identifies a segment of event data 192 to be brought to the attention of at least one other client responder site 130-2. In other words, this embodiment of the invention allows one responder site 130-1 referred to herein as a "monitor" responder site 130 to allow the responder user 131-1 to designate a particular segment of event data as being of interest to another responder site 132 referred to herein as a client responder site. The bookmark work item 151 which the monitor responder site 130-1 forwards as a work item as explained above to the event processor 150 identifies the segment of event data of interest. As an example, event data segments 192-3 through 192-6 might be of particular interest to a responder user 131-1 at the monitor responder site 131 since this segment of video may have captured the intruder 189 during operation of the sensors 180-1 and 180-2 during the event 185 (i.e., when the intruder activated the sensors 180-1 and the camera 180-2 that captured intruders movements a particular area of the protected site in event data segments 192-3 through 192-6). The bookmark work item 151 is processed differently than other work item 134 and is not forwarded to the protected site 120.

In step 295, in response to receiving a bookmark work item 151, the event processor 150 prepares a bookmark notification 176 associated with the segment of event data (e.g., event data segments 192-3 through 192-6) to be brought to the attention of the client responder site 130-2. The event processor 150 can put the bookmark notification 176 into the bookmark queue 171 for detection by the designated responder site 130 when that responder site provides its next successive periodic bookmark poll 134 (similar to an event poll).

In one embodiment, creation of a bookmark associated with a selected segment of event data of interest can cause the proxy site 110 to create a work item to retrieve a higher resolution version of the event data segment involved (i.e., identified by the bookmark as being of interest). The proxy site 110 transmits this bookmark work item on the next opportunity (e.g., in an event data acknowledgement 194, or in response to a work item poll) to the protected site 120 that then transmits back to the proxy site 110 the higher resolution version of the event data 192 which the proxy site 110 then stores and associates to this bookmark work item 144. This higher resolution version of event data 192 is then available for retrieval by any responder (by selection of that bookmark on their application).

In step 296 the event processor 150 forwards the bookmark notification 176 to the client responder site 130-2 to allow the client responder site to be notified of the existence of the segment of event data (event data segments 192-3 through 192-6) associated with the bookmark work item 151, as referenced by the distinct segment identifiers to this book marked event data 198 (e.g., event data segment identifiers, such as frame numbers in a video stream, or event data sequence numbers). The event processor 150 can forward the bookmark notification 176 in a bookmark poll response 136 that the client responder site 130-2 receives in response to a periodic bookmark poll 134-2 (like an event poll, but used to check for bookmarks) sent to the proxy site 110 as shown in FIG. 9. In this manner, the client responder site 130-2 can be notified of the existence of a particular segment of book marked event data 198 of interest to the responder user 131-2 at that site 130-2.

In step 297, event processor 150 thereafter receives a bookmark playback request 157 from the client responder site 130-2 to which the bookmark notification 176 was forwarded. This message 157 embeds uniquely identifying information (i.e. the time span) of the bookmarked event data segment to allow that responder site 130 to access the bookmarked event data. In step 298, event processor 150, in response to receiving the bookmark playback request 157, forwards the segment of book marked event data 198 (event data segments 192-3 through 192-6) associated with the bookmark notification 176 (i.e., referenced as URL 198) to the client responder site 130-2 to allow that client responder site to access the segment of book marked video data 198 identified by the bookmark work item 151 received from the monitor responder site 130-1.

In this manner, this embodiment of the invention allows two responder sites 130 to exchange segments of video data of interest to each other.

Those skilled in the art will understand that there can be many variations made to the embodiments explained above while still achieving the same objective of those embodiments and the invention in general. As an example, rearranging the order of certain processing operations may be done while still achieving the disclosed results. Such variations are intended to be covered by the scope of this invention. As such, the foregoing descriptions of embodiments of the invention are not intended to be limiting.

What is claimed is:

1. In a proxy site coupled to a protected site and to a responder site via a communications network, a method for processing event data from the protected site for access by the responder site, the method comprising the steps of:

establishing an event connection between the proxy site and the protected site, the event connection initiated from the protected site in response to an event occurring in the protected site;

receiving, over the event connection, event data associated with an event tracker device operating within the protected site;

processing the event data for access by the responder site;

establishing a responder connection between the proxy site and the responder site, the responder connection initiated from the responder site;

receiving, over the responder connection, an event data request associated with the protected site; and providing the event data, received from the protected site over the event connection, to the responder site over the responder connection, in response to the event data request, wherein direct communication between the protected site and the responder site is blocked by the proxy site.

2. The method of claim 1 wherein the event connection operates over a connection oriented protocol in the communications network and wherein establishing an event connection comprises:

receiving an event start message indicating an identification of the protected site, an identification of a sensor that detected the event occurring in the protected site, and authentication information;

validating the authenticity of the event start message;

evaluating the event start message against an event information database to determine a set of event activities to perform in response to the event start message, at least one event activity indicating that the responder site is to be notified of the event occurring in the protected site; and making an event notification available for access by the responder site.

3. The method of claim 2 wherein evaluating the event start message against an event information database to determine a set of event activities to perform in response to the event start message comprises;

comparing event rules in the event information database to the event start message to identify particular responder sites to be notified of the event occurring in the protected site based upon at least one of the identification of the sensor that detected the event and the identification of the protected site.

4. The method of claim 3 wherein making an event notification available for access by the responder site comprises:
   determining a location associated with the proxy site for storing event data received from the protected site;
   creating an event notification identifying the event occurring in the protected site and the identification of the sensor that detected the event and the location associated with the proxy site for storing event data received from the protected site, the event notification being associated with a particular responder site identified by an event rule that matched information in the event start message; and
   posting the event notification in an event availability queue for access by at least one responder site.

5. The method of claim 1 wherein receiving, over the event connection, event data associated with the event tracker device operating within the protected site comprises:
   continually receiving and storing, in an event database within a proxy site at the location for accessing the stored event data, a stream of event data over the event connection initiated from the protected site, the event data representing continual acquisition of information by the event tracker device in response to the sensor that detected the event occurring in a protected site activating the event tracker device to continually acquire the event data and to provide the event data over the event connection to the proxy site.

6. The method of claim 5 wherein processing event data for access by the responder site comprises;
   obtaining a location associated with the proxy site for storing event data received from the protected site;
   storing the event data in a streaming media format at the location for accessing stored event data;
   creating an event web page accessible to the responder site where the URL for the page is distinct, unique and opaque for each responder;
   embedding an event data uniform resource locator associated with the location for storing the event data within the event web page; and
   providing an event web page uniform resource locator within an event notification in an event availability queue accessible to the responder site.

7. The method of claim 6 wherein receiving, over the responder connection, an event data request associated with the protected site comprises:
   receiving, from the responder site, a periodic event poll requesting availability of any event notifications associated with an identity of the responder site;
   validating authenticity of the periodic event poll;
   comparing event notifications within an event availability queue with the identity of the responder site to identify any matching event notifications associated with the responder site providing the periodic event poll;
   preparing an event poll response identifying matching event notification information; and
   forwarding the event poll response containing matching event notification information to the responder site covering and identity that matches the event notification within the event availability queue.

8. The method of claim 7 wherein receiving event data comprises continuously receiving and storing event data at the proxy site over the event connection from the protected site, such that the proxy site buffers the event data from a beginning of the event until receipt, from the responder site, of the periodic event poll associated with an event notification corresponding to that event data.

9. The method of claim 7 wherein providing the event data, received from the protected site over the event connection, to the responder site over the responder connection comprises:
   receiving, from the responder site, an event monitor application request for access to stored event data associated with event notification identified within an event poll response;
   validating authenticity of the event monitor application request received from the responder site;
   obtaining the stored event data associated with the event notification from the location associated with the proxy site for storing event data received from the protected site; and
   transmitting the stored event data over the responder connection to an event monitor application capable of receiving and displaying the event data to a user of the responder site identified within the event monitor application request.

10. The method of claim 9 wherein transmitting the stored event data over the responder connection to a monitor application comprises:
    streaming the event data as streaming media over the responder connection from the proxy site to the event monitor application operating in the responder site.

11. The method of claim 10 wherein streaming the event data comprises;
    streaming the event data beginning at a segment of the event data associated with most recent event data received by the proxy site over the event connection from the protected site, such that the monitor application capable of receiving and displaying the event data can receive and display the most recent event data received over the event connection by the proxy site from the protected site;
    providing, within the stream event data, an indication of a length of the continuously received event data from a beginning of time of occurrence of the event at the protected site up to the segment of the event data associated with the most recent event data received by the proxy site, such that the monitor application can display to a user at the responder site a relative position of the stream event data relative to a beginning position of the event data; and
    transmitting stored event data that the proxy site has received and stored from a time of a beginning of the event up to a time of receipt of the most recent event data received by the proxy site over the event connection with a protected site, such that the monitor application capable of receiving and displaying the event data can receive all event data from a time of the beginning of and up to the time of receipt of the most recent event data.

12. The method of claim 1 wherein receiving, over the event connection, event data associated with an event tracker device operating within the protected site comprises:
    providing an event data acknowledgement over the event connection to the protected site to acknowledged receipt of the event data.

13. The method of claim 12 comprising:
    receiving a work item from the responder site, the work item identifying an action to be performed by a device associated with the event in the protected site;

queuing the work item in a work item queue for transmission to the protected site; and wherein providing an event data acknowledgement comprises:
detecting a work item associated with an event for which an event data acknowledgement is to be sent over the event connection to the protected site;
inserting the work item into the event data acknowledgement; and
transmitting the acknowledgement of the event data including the work item to the protected site such that the protected site can receive the work item in the acknowledgement of event data for the event and can invoke the action identified by the work item on the device associated with the event.

14. The method of claim 13 wherein the work item identifies an action to operate a camera within the protected site to perform at least one of a pan operation, a title operation, and a zoom operation.

15. The method of claim 13 wherein the work item identifies an action to operate a sensor within the protected site to perform at least one of a activate operation and a deactivate operation.

16. The method of claim 13 wherein the event data is streaming video data and wherein receiving the work item request comprises:
receiving a video resolution work item specifying an amount of resolution for the stream video event data to be produced from the protected site;
forwarding the video resolution work item to the protected site;
receiving, over a new event connection initiated by the protected site to the proxy site, event data in a resolution specified by the video resolution work item; and
storing the event data in association with other event data previously received over a former event connection between the protected site and the proxy site.

17. The method of claim 1 comprising:
comparing event rules in the event information database to the event start message to identify a plurality of responder sites to be notified of the event occurring in the protected site based upon information in the event start message including at least one of an identification of the sensor that detected the event and an identification of the protected site;
providing an event notification to the plurality of responder sites;
establishing a responder connection initiated by the plurality of responder sites; and
providing from the proxy site, the event data associated with the event for which the event start message was received from the protected site, to the plurality of responder sites.

18. The method of claim 17 comprising:
receiving a bookmark work item from a monitor site within the plurality of responder sites, the bookmark work item identifying a segment of event data to be brought to the attention of at least one client responder site;
preparing a bookmark notification associated with the segment of event data to be brought to the attention of the at least one client responder site; and
forwarding the bookmark notification to the at least one client responder site to allow the at least one client responder site to be notified of the existence of the segment of event data associated with the bookmark work item.

19. The method of claim 18 comprising:
receiving a bookmark playback request from one of the at least one client responder site to which the bookmark notification was forwarded;
forwarding the segment of event data associated with the bookmark notification to the one of the at least one client responder site to allow that client responder site to access the segment of video data identified by the bookmark work item received from the monitor site.

20. The method of claim 17 wherein the event rules indicate different actions required to notify different responder sites of the plurality of responder sites, and wherein one responder site of the plurality of responder sites is a monitor site and wherein another responder site is a client responder site.

21. The method of claim 1 further comprising:
detecting an ending condition associated with the event;
removing allocated event resources within the proxy site associated with the event connection and removing the event data; and
disallowing incoming event and responder connections for access to information associated with the event data.

22. A method for processing event information within a protected site, the method comprising:
detecting an event signal from an event sensor device, the event signal indicating activation of the event sensor;
in response to detecting the event signal:
initiating an event connection with an event processor, the event processor located within a proxy site;
transmitting an event start message to an event processor over the event connection;
obtaining event data from an event tracker device associated with the event sensor device;
transmitting event data obtained from the event tracker device to the event processor over the event connection; and
repeating the steps of obtaining event data and transmitting event data to continuously supply the event processor with event data from the event tracker device over the event connection, wherein the protected site blocks all inbound connections received via a network interface.

23. The method of claim 22 wherein, transmitting event data comprises:
receiving an event data acknowledgement message in response to transmitting the event data;
retrieving an event tracker device command embedded within the event data acknowledgement message; and
controlling the event tracker device associated with the event sensor device, the control performed according to the event tracker device command.

24. The method of claim 23 wherein the event tracker device is a camera device and wherein the event data is image data obtained from the camera device in response to activation of the camera device in response to the event signal from the event sensor device; and
wherein the event tracker device command is a camera command embedded within the received event data acknowledgement message, the camera command specifying an operation to be performed by the camera device to control acquisition of the image data obtained from the camera device.

25. The method of claim 22 wherein obtaining event data from an event tracker device comprises:
obtaining a high resolution stream of event data from the event tracker device;

storing the high resolution stream of event data within the protected site; and wherein transmitting event data obtained from the event tracker device to the event processor over the event connection comprises:

initially transmitting, to the event processor over the event connection, a low resolution stream of event data derived from the high resolution stream of event data; and wherein the method further comprises;

receiving an event data resolution work item request requesting transmission of a portion of the high resolution stream of event data from the protected site to the proxy site, and in response:

initiating a secondary event connection with an event processor; and transmitting the request portion of the high resolution stream of event data to the event processor over the secondary event connection.

26. In a responder site, a method for processing event data, the method comprising:

transmitting a periodic event poll to an event processor in a proxy site, the periodic event poll requesting available notifications concerning event data related to a protected site, wherein the proxy site blocks any direct communications transmitted by the responder site to the protected site;

receiving an event poll response containing a notification having a reference to event data available for access within the proxy site; and accessing the event data from the proxy site using the reference to the event data from the notification.

27. The method of claim 26 wherein accessing the event data from the proxy site comprises:

receiving and presenting to a responder user a first portion of event data corresponding to event data most recently received by the proxy site from the protected site; and while accessing the first portion of event data, receiving a second portion of event data corresponding to event data formerly received and stored by the proxy site from the protected site prior to the responder site transmitting the periodic poll, such that the responder site receives older event data while concurrently receiving and presenting to the responder user the most recently received event data.

28. The method of claim 26 wherein the notification is at least one of an event notification and a bookmark notification provided in an event poll response by the proxy site, each of the event notification and the bookmark notification identifying stored event data at the proxy site available for access by the responder site.

29. The method of claim 26 wherein accessing the event data comprises referencing an event web page containing a uniform resource locator to stored event data in the proxy site.

30. The method of claim 26 wherein the responder site is a first responder site and wherein the method further comprises:

receiving a bookmark work item definition identifying a segment of event data of interest to a second responder site; and transmitting a bookmark work item to the proxy site to indicate to the proxy site the segment of event data of interest to the second responder site.

31. A computerized proxy site device comprising:
a communications interface;
a central processing unit;
a memory encoded with logic instructions that form an event processor; and
an interconnection mechanism coupling the communications interface, the central processing unit and the memory;
wherein the central processing unit executes the logic instructions that form the event processor, such execution causing the computerized device to perform the operations of:
establishing an event connection between the computerized proxy site device and a protected site, the event connection initiated from the protected site in response to an event occurring in the protected site;
receiving, over the event connection, event data associated with an event tracker device operating within the protected site;
processing the event data for access by a responder site;
establishing a responder connection between the computerized proxy site device and the responder site, the responder connection initiated from the responder site;
receiving, over the responder connection, an event data request associated with the protected site; and
providing the event data, received from the protected site over the event connection, to the responder site over the responder connection, in response to the event data request, wherein direct communication between the protected site and the responder site is blocked by the proxy site.

32. A computerized protected site device comprising:
a communications interface;
a sensor interface;
a central processing unit;
a memory encoded with logic instructions that form an event data collector; and
an interconnection mechanism coupling the communications interface, the sensor interface, the central processing unit and the memory;
wherein the central processing unit executes the logic instructions that form the event data collector, such execution causing the computerized device to perform the operations of:
detecting an event signal from an event sensor device coupled to the sensor interface, the event signal indicating activation of the event sensor;
in response to detecting the event signal:
  initiating an event connection with an event processor over the communications interface, the event processor located within a proxy site;
  transmitting, over the communication interface, an event start message to an event processor in a proxy site over the event connection;
  obtaining event data from an event tracker device coupled to the sensor interface and associated with the event sensor device;
  transmitting, over the communications interface, event data obtained from the event tracker device to the event processor over the event connection; and
  repeating the steps of obtaining event data and transmitting event data to continuously supply the event processor in the proxy site with event data from the event tracker device over the event connection, wherein the protected site blocks all inbound connections received via a network interface.

33. A computerized responder site device comprising:
a communications interface;
a central processing unit;

a memory encoded with logic instructions that form an event monitor application; and an interconnection mechanism coupling the communications interface, the central processing unit and the memory;

wherein the central processing unit executes the logic instructions that form the event monitor application, such execution causing the computerized device to perform the operations of:

transmitting, over the communications interface, a periodic event poll to an event processor program executing in a proxy site, the periodic event poll requesting available notifications concerning event data related to a protected site, wherein the proxy site blocks any direct communications transmitted by the responder site to the protected site;

receiving, over the communications interface, an event poll response containing a notification having a reference to event data available for access within the proxy site; and accessing, over the communications interface, the event data from the proxy site using the reference to the event data from the notification.

* * * * *